US00RE51055E

(19) United States
(12) Reissued Patent
Szczeszynski et al.

(10) Patent Number: US RE51,055 E
(45) Date of Reissued Patent: *Oct. 6, 2026

(54) CHARGE PUMP WITH TEMPORALLY-VARYING ADIABATICITY

(71) Applicant: pSemi Corporation, San Diego, CA (US)

(72) Inventors: Gregory Szczeszynski, Nashua, NH (US); Oscar Blyde, Melrose, MA (US); David M. Giuliano, Bedford, NH (US); Jeffrey Summit, Jefferson, MA (US); Raymond Barrett, Merrimack, NH (US)

(73) Assignee: pSemi Corporation, San Diego, CA (US)

( * ) Notice: This patent is subject to a terminal disclaimer.

(21) Appl. No.: 18/100,085

(22) Filed: Jan. 23, 2023

Related U.S. Patent Documents

Reissue of:
(64) Patent No.: 10,162,376
Issued: Dec. 25, 2018
Appl. No.: 15/460,596
Filed: Mar. 16, 2017

U.S. Applications:
(60) Division of application No. 17/133,909, filed on Dec. 24, 2020, now Pat. No. Re. 49,449, which is an application for the reissue of Pat. No. 10,162,376, which is a continuation of application No. 14/719,815, filed on May 22, 2015, now Pat. No. 9,658,635, which is a continuation of application No.
(Continued)

(51) Int. Cl.
*G05F 1/10* (2006.01)
*G05F 3/02* (2006.01)
*H02M 3/07* (2006.01)

(52) U.S. Cl.
CPC ..... *G05F 3/02* (2013.01); *H02M 3/07* (2013.01)

(58) Field of Classification Search
CPC . G05F 1/10; G05F 3/02; G06F 3/0416; G06F 3/044; G11C 16/0433; H02M 3/07
See application file for complete search history.

(56) References Cited

U.S. PATENT DOCUMENTS 3,370,215 A 2/1968 Light, Jr.
3,745,437 A 7/1973 Brown
(Continued)

FOREIGN PATENT DOCUMENTS

CN 1057410 A 1/1992
CN 1132959 A 10/1996
(Continued)

OTHER PUBLICATIONS

Cheng—"New Generation of Switched Capacitor Converters" PESC 98 Record, 29th Annual IEEE Power Electronics and Motion Control Conference, Wuhan, China, May 17-20, 2009, pp. 1529-1535, 7 pages.
(Continued)

*Primary Examiner* — My Trang Ton
(74) *Attorney, Agent, or Firm* — Haynes and Boone, LLP

(57) ABSTRACT

Operation of a charge pump is controlled to optimize power conversion efficiency by using an adiabatic mode with some operating characteristics and a non-adiabatic mode with other characteristics. The control is implemented by controlling a configurable circuit at the output of the charge pump.

31 Claims, 5 Drawing Sheets

Related U.S. Application Data

14/027,716, filed on Sep. 16, 2013, now Pat. No. 9,041,459.

(56) References Cited

U.S. PATENT DOCUMENTS

| | | | |
|---|---|---|---|
| 3,818,306 | A | 6/1974 | Marini |
| 3,818,360 | A | 6/1974 | Boutmy et al. |
| 4,214,174 | A | 7/1980 | Dickson |
| 4,408,268 | A | 10/1983 | Peters et al. |
| 4,415,959 | A | 11/1983 | Vinciarelli |
| 4,513,364 | A | 4/1985 | Nilssen |
| 4,604,584 | A | 8/1986 | Kelley |
| 4,713,742 | A | 12/1987 | Parsley |
| 4,812,961 | A | 3/1989 | Essaff et al. |
| 4,903,181 | A | 2/1990 | Seidel |
| 5,006,782 | A | 4/1991 | Pelly |
| 5,057,986 | A | 10/1991 | Henze et al. |
| 5,119,283 | A | 6/1992 | Steigerwald et al. |
| 5,132,606 | A | 7/1992 | Herbert |
| 5,132,895 | A | 7/1992 | Kase |
| 5,159,539 | A | 10/1992 | Koyama |
| 5,198,970 | A | 3/1993 | Kawabata et al. |
| 5,268,832 | A | 12/1993 | Kandatsu |
| 5,301,097 | A | 4/1994 | McDaniel |
| 5,331,303 | A | 7/1994 | Shiota |
| 5,345,376 | A | 9/1994 | Nourbakhsh |
| 5,402,329 | A | 3/1995 | Wittenbreder, Jr. |
| 5,548,206 | A | 8/1996 | Soo |
| 5,557,193 | A | 9/1996 | Kajimoto |
| 5,563,779 | A | 10/1996 | Cave et al. |
| 5,581,454 | A | 12/1996 | Collins |
| 5,602,794 | A | 2/1997 | Javanifard et al. |
| 5,610,807 | A | 3/1997 | Kanda et al. |
| 5,661,348 | A | 8/1997 | Brown |
| 5,717,581 | A | 2/1998 | Canclini |
| 5,737,201 | A | 4/1998 | Meynard et al. |
| 5,761,058 | A | 6/1998 | Kanda et al. |
| 5,793,626 | A | 8/1998 | Jiang |
| 5,801,987 | A | 9/1998 | Dinh |
| 5,812,017 | A | 9/1998 | Golla et al. |
| 5,831,846 | A | 11/1998 | Jiang |
| 5,892,395 | A | 4/1999 | Stengel et al. |
| 5,907,484 | A | 5/1999 | Kowshik et al. |
| 5,956,243 | A | 9/1999 | Mao |
| 5,959,565 | A | 9/1999 | Taniuchi et al. |
| 5,959,585 | A | 9/1999 | Militz |
| 5,978,283 | A | 11/1999 | Hsu et al. |
| 5,982,645 | A | 11/1999 | Levran et al. |
| 5,991,169 | A | 11/1999 | Kooken |
| 6,021,056 | A | 2/2000 | Forbes et al. |
| 6,055,168 | A | 4/2000 | Kotowski et al. |
| 6,084,789 | A | 7/2000 | Van Lieshout |
| 6,107,864 | A | 8/2000 | Fukushima |
| 6,133,788 | A | 10/2000 | Dent |
| 6,140,807 | A | 10/2000 | Vannatta et al. |
| 6,154,380 | A | 11/2000 | Assow et al. |
| 6,157,253 | A | 12/2000 | Sigmon et al. |
| 6,169,457 | B1 | 1/2001 | Ichimaru |
| 6,169,673 | B1 | 1/2001 | McIntyre et al. |
| 6,178,102 | B1 | 1/2001 | Stanley |
| 6,198,645 | B1 | 3/2001 | Kotowski et al. |
| 6,255,896 | B1 | 7/2001 | Li |
| 6,255,906 | B1 | 7/2001 | Eidson et al. |
| 6,275,018 | B1 | 8/2001 | Telefus et al. |
| 6,316,956 | B1 | 11/2001 | Oglesbee |
| 6,327,462 | B1 | 12/2001 | Loke et al. |
| 6,329,796 | B1 | 12/2001 | Popescu |
| 6,339,538 | B1 | 1/2002 | Handleman |
| 6,362,986 | B1 | 3/2002 | Schultz et al. |
| 6,377,117 | B2 | 4/2002 | Oskowsky et al. |
| 6,396,341 | B1 | 5/2002 | Pehlke |
| 6,400,579 | B2 | 6/2002 | Cuk |
| 6,429,632 | B1 | 8/2002 | Forbes et al. |
| 6,456,153 | B2 | 9/2002 | Buck et al. |
| 6,476,666 | B1 | 11/2002 | Palusa et al. |
| 6,486,728 | B2 | 11/2002 | Kleveland |
| 6,501,325 | B1 | 12/2002 | Meng |
| 6,504,422 | B1 | 1/2003 | Rader et al. |
| 6,507,503 | B2 | 1/2003 | Norrga |
| 6,515,612 | B1 | 2/2003 | Abel |
| 6,563,235 | B1 | 5/2003 | McIntyre et al. |
| 6,597,235 | B2 | 7/2003 | Choi |
| 6,617,832 | B1 | 9/2003 | Kobayashi |
| 6,650,552 | B2 | 11/2003 | Takagi et al. |
| 6,657,876 | B2 | 12/2003 | Satoh |
| 6,700,803 | B2 | 3/2004 | Krein |
| 6,738,277 | B2 | 5/2004 | Odell |
| 6,738,432 | B2 | 5/2004 | Pehlke et al. |
| 6,759,766 | B2 | 7/2004 | Hiratsuka et al. |
| 6,791,298 | B2 | 9/2004 | Shenai et al. |
| 6,798,177 | B1 | 9/2004 | Liu et al. |
| 6,906,567 | B2 | 6/2005 | Culler |
| 6,927,441 | B2 | 8/2005 | Pappalardo et al. |
| 6,934,167 | B2 | 8/2005 | Jang et al. |
| 6,980,045 | B1 | 12/2005 | Liu |
| 6,980,181 | B2 | 12/2005 | Sudo |
| 6,995,995 | B2 | 2/2006 | Zeng et al. |
| 7,009,858 | B2 | 3/2006 | Umeda et al. |
| 7,071,660 | B2 | 7/2006 | Xu et al. |
| 7,072,195 | B2 | 7/2006 | Xu |
| 7,091,778 | B2 | 8/2006 | Gan et al. |
| 7,103,114 | B1 | 9/2006 | Lapierre |
| 7,135,847 | B2 | 11/2006 | Taurand |
| 7,145,382 | B2 | 12/2006 | Ker et al. |
| 7,157,956 | B2 | 1/2007 | Wei |
| 7,161,816 | B2 | 1/2007 | Shteynberg et al. |
| 7,190,210 | B2 | 3/2007 | Azrai et al. |
| 7,224,062 | B2 | 5/2007 | Hsu |
| 7,236,542 | B2 | 6/2007 | Matero |
| 7,239,194 | B2 | 7/2007 | Azrai et al. |
| 7,250,810 | B1 | 7/2007 | Tsen |
| 7,259,974 | B2 | 8/2007 | Donaldson et al. |
| 7,269,036 | B2 | 9/2007 | Deng et al. |
| 7,330,070 | B2 | 2/2008 | Vaísanen |
| 7,362,251 | B2 | 4/2008 | Jensen et al. |
| 7,365,523 | B2 | 4/2008 | Malherbe et al. |
| 7,375,992 | B2 | 5/2008 | Mok et al. |
| 7,382,113 | B2 | 6/2008 | Wai et al. |
| 7,382,634 | B2 | 6/2008 | Buchmann |
| 7,397,677 | B1 | 7/2008 | Collins et al. |
| 7,400,118 | B1 | 7/2008 | Zhang et al. |
| 7,408,330 | B1 | 8/2008 | Zhao |
| 7,436,239 | B2 | 10/2008 | Masuko et al. |
| 7,443,705 | B2 | 10/2008 | Ito |
| 7,511,978 | B2 | 3/2009 | Chen et al. |
| 7,521,914 | B2 | 4/2009 | Dickerson et al. |
| 7,535,133 | B2 | 5/2009 | Perreault et al. |
| 7,545,127 | B2 | 6/2009 | Takahashi et al. |
| 7,589,605 | B2 | 9/2009 | Perreault et al. |
| 7,595,682 | B2 | 9/2009 | Lin et al. |
| 7,595,683 | B1 | 9/2009 | Floyd |
| 7,616,467 | B2 | 11/2009 | Mallwitz |
| 7,633,778 | B2 | 12/2009 | Mok et al. |
| 7,642,797 | B2 | 1/2010 | Kojima et al. |
| 7,656,740 | B2 | 2/2010 | Yu et al. |
| 7,659,760 | B2 | 2/2010 | Doi |
| 7,679,429 | B2 | 3/2010 | Nakamura |
| 7,679,430 | B2 | 3/2010 | Fort |
| 7,696,735 | B2 | 4/2010 | Oraw et al. |
| 7,705,672 | B1 | 4/2010 | Rodriguez |
| 7,705,681 | B2 | 4/2010 | Ilkov |
| 7,724,551 | B2 | 5/2010 | Yanagida |
| 7,746,041 | B2 | 6/2010 | Xu et al. |
| 7,768,800 | B2 | 8/2010 | Mazumder et al. |
| 7,777,459 | B2 | 8/2010 | Williams |
| 7,782,027 | B2 | 8/2010 | Williams |
| 7,786,712 | B2 | 8/2010 | Williams |
| 7,807,499 | B2 | 10/2010 | Nishizawa |
| 7,808,324 | B1 | 10/2010 | Woodford |
| 7,812,579 | B2 | 10/2010 | Williams |
| 7,889,519 | B2 | 2/2011 | Perreault et al. |
| 7,907,429 | B2 | 3/2011 | Ramadass et al. |
| 7,907,430 | B2 | 3/2011 | Kularatna et al. |
| 7,928,705 | B2 | 4/2011 | Hooijschuur et al. |

(56) References Cited

U.S. PATENT DOCUMENTS 7,940,038 B2 5/2011 Da Silva et al.
7,944,276 B2 5/2011 Nakai
7,952,418 B2 5/2011 McDonald et al.
7,956,572 B2 6/2011 Zane et al.
7,956,673 B2 6/2011 Pan
7,977,921 B2 7/2011 Bahai et al.
7,977,927 B2 7/2011 Williams
7,999,601 B2 8/2011 Schlueter et al.
8,000,117 B2 8/2011 Petricek
8,018,216 B2 9/2011 Kakehi
8,026,763 B2 9/2011 Dawson et al.
8,031,003 B2 10/2011 Dishop
8,035,148 B2 10/2011 Goldstein
8,040,174 B2 10/2011 Likhterov
8,048,766 B2 11/2011 Joly et al.
8,076,915 B2 12/2011 Nakazawa
8,085,524 B2 12/2011 Roozeboom et al.
8,089,788 B2 1/2012 Jain
8,102,157 B2 1/2012 Abe
8,106,597 B2 1/2012 Mednik et al.
8,111,052 B2 2/2012 Glovinsky
8,111,054 B2 2/2012 Yen et al.
8,130,518 B2 3/2012 Fishman
8,154,333 B2 4/2012 Ker et al.
8,159,091 B2 4/2012 Yeates
8,164,369 B2 * 4/2012 Raghunathan ..... H03L 7/0891 327/149
8,164,384 B2 4/2012 Dawson et al.
8,169,797 B2 5/2012 Coccia et al.
8,193,604 B2 6/2012 Lin et al.
8,212,541 B2 7/2012 Perreault et al.
8,248,045 B2 8/2012 Shiu
8,248,054 B2 8/2012 Tong
8,248,145 B2 * 8/2012 Melanson ..... H02M 3/158 327/536
8,274,322 B2 9/2012 Chang et al.
8,276,002 B2 9/2012 Dennard et al.
8,330,436 B2 12/2012 Oraw et al.
8,339,102 B2 12/2012 Kushnarenko et al.
8,339,184 B2 12/2012 Kok et al.
8,350,549 B2 1/2013 Kitabatake
8,354,828 B2 1/2013 Huang et al.
8,384,467 B1 2/2013 O'Keeffe et al.
8,395,914 B2 3/2013 Klootwijk et al.
8,423,800 B2 4/2013 Huang et al.
8,436,674 B1 5/2013 Standley
8,451,053 B2 5/2013 Perreault et al.
8,456,874 B2 6/2013 Singer et al.
8,503,203 B1 8/2013 Szczeszynski et al.
8,515,361 B2 8/2013 Levesque et al.
8,538,355 B2 9/2013 Stockert
8,542,061 B2 9/2013 Levesque et al.
8,542,169 B2 9/2013 Senda
8,559,898 B2 10/2013 Jones et al.
8,565,694 B2 10/2013 Jones et al.
8,571,492 B2 10/2013 Berchtold et al.
8,582,333 B2 11/2013 Oraw et al.
8,619,443 B2 12/2013 Low
8,619,445 B1 12/2013 Low et al.
8,629,666 B2 1/2014 Carroll et al.
8,643,347 B2 2/2014 Giuliano et al.
8,659,353 B2 2/2014 Dawson et al.
8,670,254 B2 3/2014 Perreault et al.
8,674,545 B2 3/2014 Signorelli et al.
8,693,224 B1 4/2014 Giuliano
8,699,248 B2 4/2014 Giuliano et al.
8,699,973 B2 4/2014 Southcombe et al.
8,706,063 B2 4/2014 Honjo et al.
8,712,349 B2 4/2014 Southcombe et al.
8,718,188 B2 5/2014 Balteanu et al.
8,723,491 B2 5/2014 Giuliano
8,724,353 B1 5/2014 Giuliano et al.
8,729,819 B2 5/2014 Zhao et al.
8,731,498 B2 5/2014 Southcombe et al.
8,737,093 B1 5/2014 Baker et al.
8,743,553 B2 6/2014 Giuliano
8,750,539 B2 6/2014 Pennock et al.
8,760,219 B2 6/2014 Chao
8,803,492 B2 8/2014 Liu
8,811,920 B2 8/2014 Deuchars et al.
8,811,921 B2 8/2014 Jones et al.
8,817,501 B1 8/2014 Low et al.
8,824,978 B2 9/2014 Briffa et al.
8,829,993 B2 9/2014 Briffa et al.
8,830,709 B2 9/2014 Perreault
8,830,710 B2 9/2014 Perreault et al.
8,831,544 B2 9/2014 Walker et al.
8,842,399 B2 9/2014 Jones et al.
8,854,019 B1 10/2014 Levesque et al.
8,854,849 B2 10/2014 Kobeda et al.
8,856,562 B2 10/2014 Huang et al.
8,860,396 B2 10/2014 Giuliano
8,867,281 B2 10/2014 Tran et al.
8,874,828 B2 10/2014 Fai et al.
8,891,258 B2 11/2014 Zhang et al.
8,892,063 B2 11/2014 Jones et al.
8,913,967 B2 12/2014 Zimlich et al.
8,913,971 B2 12/2014 Arkiszewski et al.
8,942,650 B2 1/2015 Southcombe et al.
8,942,651 B2 1/2015 Jones
8,947,157 B2 2/2015 Levesque et al.
8,957,727 B2 2/2015 Dawson et al.
8,958,763 B2 2/2015 Williams et al.
8,981,836 B2 3/2015 Kern et al.
8,983,407 B2 3/2015 Southcombe et al.
8,983,409 B2 3/2015 Ngo et al.
8,983,410 B2 3/2015 Southcombe et al.
8,989,685 B2 3/2015 Southcombe et al.
9,008,597 B2 4/2015 Levesque et al.
9,030,256 B2 5/2015 Jones et al.
9,041,459 B2 5/2015 Szczeszynski
9,048,787 B2 6/2015 Jones et al.
9,077,405 B2 7/2015 Jones et al.
9,143,032 B2 9/2015 Le et al.
9,143,037 B2 9/2015 Giuliano
9,184,701 B2 11/2015 Berchtold et al.
9,203,299 B2 12/2015 Low et al.
9,209,758 B2 12/2015 Briffa et al.
9,209,787 B2 12/2015 Shelton et al.
9,214,865 B2 12/2015 Levesque et al.
9,214,900 B2 12/2015 Arkiszewski
9,362,825 B2 6/2016 Southcombe et al.
9,362,826 B2 6/2016 Giuliano
9,374,001 B1 6/2016 Subramaniam et al.
9,413,257 B2 8/2016 Wang et al.
9,444,329 B2 9/2016 Arno
9,450,506 B2 9/2016 Perreault et al.
9,502,968 B2 11/2016 Giuliano et al.
9,553,550 B2 1/2017 Puliafico et al.
9,577,590 B2 2/2017 Levesque et al.
9,584,024 B2 2/2017 Manthe et al.
9,601,998 B2 3/2017 Le et al.
9,621,138 B1 4/2017 Zhang et al.
9,634,577 B2 4/2017 Perreault
9,658,635 B2 5/2017 Szczeszynski
9,712,051 B2 7/2017 Giuliano
9,722,492 B2 8/2017 Levesque et al.
9,742,266 B2 8/2017 Giuliano
9,819,283 B2 11/2017 Mahdavikhah et al.
9,847,712 B2 12/2017 Low et al.
9,847,715 B2 12/2017 Giuliano et al.
9,882,471 B2 1/2018 Giuliano
9,899,919 B2 2/2018 Crossley et al.
9,900,204 B2 2/2018 Levesque et al.
10,162,376 B2 12/2018 Szczeszynski
10,243,457 B2 3/2019 Puggelli et al.
10,263,512 B2 4/2019 Giuliano et al.
10,274,987 B2 4/2019 Puggelli et al.
10,326,358 B2 6/2019 Giuliano
10,355,593 B1 7/2019 Puggelli et al.
10,374,512 B2 8/2019 Szczeszynski et al.
10,381,924 B2 8/2019 Giuliano
10,389,235 B2 8/2019 Giuliano
10,389,244 B2 8/2019 Le et al.

(56) References Cited

U.S. PATENT DOCUMENTS 10,404,162 B2 9/2019 Giuliano
10,411,490 B2 9/2019 Melgar et al.
10,523,039 B2 12/2019 Melgar et al.
10,541,603 B2 1/2020 Puggelli et al.
10,601,311 B2 3/2020 Meyvaert et al.
10,666,134 B2 5/2020 Low et al.
10,673,335 B2 6/2020 Le et al.
10,680,515 B2 6/2020 Giuliano
10,686,380 B2 6/2020 Giuliano
10,715,035 B2 7/2020 Li et al.
10,720,832 B2 7/2020 Meyvaert et al.
10,770,976 B2 9/2020 Giuliano et al.
10,833,579 B1 11/2020 Puggelli et al.
11,264,895 B2 3/2022 Giuliano et al.
11,342,844 B1 5/2022 Meyvaert
11,515,784 B2 11/2022 Meyvaert
2002/0008567 A1 1/2002 Henry
2002/0130704 A1 9/2002 Myono et al.
2002/0158660 A1 10/2002 Jang et al.
2003/0038669 A1 2/2003 Zhang
2003/0058665 A1 3/2003 Kobayashi et al.
2003/0151449 A1 8/2003 Nakagawa et al.
2003/0169096 A1 9/2003 Hsu et al.
2003/0169896 A1 9/2003 Kirk, III et al.
2003/0227280 A1 12/2003 Vinciarelli
2004/0041620 A1 3/2004 D'Angelo et al.
2004/0080964 A1 4/2004 Buchmann
2004/0095787 A1 5/2004 Donaldson et al.
2004/0170030 A1 9/2004 Duerbaum et al.
2004/0222775 A1 11/2004 Muramatsu et al.
2004/0246044 A1 12/2004 Myono et al.
2005/0007184 A1 1/2005 Kamijo
2005/0024125 A1 2/2005 McNitt et al.
2005/0068073 A1* 3/2005 Shi ..... H03L 7/0812 327/156
2005/0088865 A1 4/2005 Lopez et al.
2005/0102798 A1 5/2005 Kato
2005/0136873 A1* 6/2005 Kim ..... H03L 7/0891 455/260
2005/0169021 A1 8/2005 Itoh
2005/0207133 A1 9/2005 Pavier et al.
2005/0213267 A1 9/2005 Azrai et al.
2005/0254272 A1 11/2005 Vinciarelli
2005/0285767 A1 12/2005 Wang et al.
2005/0286278 A1 12/2005 Perreault et al.
2006/0139021 A1 6/2006 Taurand
2006/0186947 A1 8/2006 Lin et al.
2006/0213890 A1 9/2006 Kooken et al.
2006/0226130 A1 10/2006 Kooken et al.
2007/0018700 A1 1/2007 Yen
2007/0035973 A1 2/2007 Kitazaki et al.
2007/0035977 A1 2/2007 Odell
2007/0051712 A1 3/2007 Kooken et al.
2007/0066224 A1 3/2007 d'Hont et al.
2007/0066250 A1 3/2007 Takahashi et al.
2007/0069818 A1 3/2007 Bhatti et al.
2007/0091655 A1 4/2007 Oyama et al.
2007/0123184 A1 5/2007 Nesimoglu et al.
2007/0146020 A1 6/2007 Williams
2007/0146052 A1 6/2007 Byeon
2007/0146090 A1 6/2007 Carey et al.
2007/0159257 A1 7/2007 Lee et al.
2007/0171680 A1 7/2007 Perreault et al.
2007/0182368 A1 8/2007 Yang
2007/0210774 A1 9/2007 Kimura et al.
2007/0230221 A1 10/2007 Lim et al.
2007/0247222 A1 10/2007 Sorrells et al.
2007/0247253 A1 10/2007 Carey et al.
2007/0281635 A1 12/2007 McCallister et al.
2007/0290747 A1 12/2007 Traylor et al.
2007/0291718 A1 12/2007 Chan et al.
2007/0296383 A1 12/2007 Xu et al.
2008/0001660 A1 1/2008 Rasmussen
2008/0003960 A1 1/2008 Zolfaghari
2008/0003962 A1 1/2008 Ngai
2008/0007333 A1 1/2008 Lee et al.
2008/0008273 A1 1/2008 Kim et al.
2008/0009248 A1 1/2008 Rozenblit et al.
2008/0012637 A1 1/2008 Aridas et al.
2008/0013236 A1 1/2008 Weng
2008/0019459 A1 1/2008 Chen et al.
2008/0024198 A1 1/2008 Bitonti et al.
2008/0031023 A1 2/2008 Kitagawa et al.
2008/0051044 A1 2/2008 Takehara
2008/0055946 A1 3/2008 Lesso et al.
2008/0062724 A1 3/2008 Feng et al.
2008/0136500 A1 6/2008 Frulio et al.
2008/0136559 A1 6/2008 Takahashi et al.
2008/0136991 A1 6/2008 Senda
2008/0150619 A1 6/2008 Lesso et al.
2008/0150621 A1 6/2008 Lesso et al.
2008/0157732 A1 7/2008 Williams
2008/0157733 A1 7/2008 Williams
2008/0158915 A1 7/2008 Williams
2008/0186081 A1 8/2008 Yamahira et al.
2008/0231233 A1 9/2008 Thornton
2008/0233913 A1 9/2008 Sivasubramaniam
2008/0239772 A1 10/2008 Oraw et al.
2008/0266917 A1 10/2008 Lin et al.
2008/0284398 A1 11/2008 Qiu et al.
2009/0004981 A1 1/2009 Eliezer et al.
2009/0033289 A1 2/2009 Xing et al.
2009/0033293 A1 2/2009 Xing et al.
2009/0039843 A1 2/2009 Kudo
2009/0059630 A1 3/2009 Williams
2009/0066407 A1 3/2009 Bowman et al.
2009/0072800 A1 3/2009 Ramadass et al.
2009/0102439 A1 4/2009 Williams
2009/0147554 A1 6/2009 Adest et al.
2009/0174383 A1 7/2009 Tsui et al.
2009/0176464 A1 7/2009 Liang et al.
2009/0196082 A1 8/2009 Mazumder et al.
2009/0206804 A1 8/2009 Xu et al.
2009/0225012 A1 9/2009 Choi
2009/0230934 A1 9/2009 Hooijschuur et al.
2009/0257211 A1 10/2009 Kontani et al.
2009/0273955 A1 11/2009 Tseng et al.
2009/0278520 A1 11/2009 Perreault et al.
2009/0302686 A1 12/2009 Fishman
2009/0303753 A1 12/2009 Fu et al.
2009/0309566 A1 12/2009 Shiu
2009/0311980 A1 12/2009 Sjoland
2009/0322304 A1 12/2009 Oraw et al.
2009/0322414 A1 12/2009 Oraw et al.
2009/0323380 A1 12/2009 Harrison
2010/0013548 A1 1/2010 Barrow
2010/0027596 A1 2/2010 Bellaouar et al.
2010/0060326 A1 3/2010 Palmer et al.
2010/0073084 A1 3/2010 Hur et al.
2010/0085786 A1 4/2010 Chiu et al.
2010/0097104 A1 4/2010 Yang et al.
2010/0110741 A1 5/2010 Lin et al.
2010/0117612 A1 5/2010 Klootwijk et al.
2010/0117700 A1 5/2010 Raghunathan et al.
2010/0117719 A1 5/2010 Matano
2010/0118458 A1 5/2010 Coffey
2010/0120475 A1 5/2010 Taniuchi et al.
2010/0123447 A1 5/2010 Vecera et al.
2010/0140736 A1 6/2010 Lin et al.
2010/0142239 A1 6/2010 Hopper
2010/0156370 A1 6/2010 Tseng
2010/0164579 A1 7/2010 Acatrinei
2010/0176869 A1 7/2010 Horie et al.
2010/0201441 A1 8/2010 Gustavsson
2010/0202161 A1 8/2010 Sims et al.
2010/0205614 A1 8/2010 Harrington
2010/0214746 A1 8/2010 Lotfi et al.
2010/0237833 A1 9/2010 Abe
2010/0244189 A1 9/2010 Klootwijk et al.
2010/0244585 A1 9/2010 Tan et al.
2010/0244935 A1 9/2010 Kim
2010/0291888 A1 11/2010 Hadjichristos et al.
2010/0308751 A1 12/2010 Nerone
2010/0321041 A1 12/2010 Feldtkeller

(56) References Cited

U.S. PATENT DOCUMENTS

2011/0001542 A1 1/2011 Ranta et al.
2011/0026275 A1 2/2011 Huang et al.
2011/0050325 A1* 3/2011 Schatzberger ..... H02M 3/073 327/536
2011/0051476 A1 3/2011 Manor et al.
2011/0062940 A1 3/2011 Shvartsman
2011/0089483 A1 4/2011 Reynes et al.
2011/0101884 A1 5/2011 Kim et al.
2011/0101938 A1 5/2011 Ma et al.
2011/0115550 A1 5/2011 Pelley
2011/0148385 A1 6/2011 North et al.
2011/0148518 A1 6/2011 Lejon et al.
2011/0156819 A1 6/2011 Kim et al.
2011/0163414 A1 7/2011 Lin et al.
2011/0175591 A1 7/2011 Cuk
2011/0176335 A1 7/2011 Li et al.
2011/0181115 A1 7/2011 Ivanov
2011/0181128 A1 7/2011 Perreault et al.
2011/0204858 A1 8/2011 Kudo
2011/0236766 A1 9/2011 Kolosnitsyn et al.
2011/0241767 A1 10/2011 Curatola
2011/0273151 A1 11/2011 Lesso et al.
2011/0304310 A1 12/2011 Sotono
2012/0014153 A1 1/2012 Christoph et al.
2012/0043818 A1 2/2012 Stratakos et al.
2012/0050137 A1 3/2012 Hellenthal et al.
2012/0064953 A1 3/2012 Dagher et al.
2012/0075891 A1 3/2012 Zhang et al.
2012/0105137 A1 5/2012 Kok et al.
2012/0119718 A1 5/2012 Song
2012/0126909 A1 5/2012 McCune
2012/0139515 A1 6/2012 Li
2012/0146177 A1 6/2012 Choi et al.
2012/0146451 A1 6/2012 Nitta
2012/0153907 A1 6/2012 Carobolante et al.
2012/0153912 A1 6/2012 Demski et al.
2012/0154023 A1 6/2012 Pan et al.
2012/0158188 A1 6/2012 Madala
2012/0170334 A1 7/2012 Menegoli et al.
2012/0176195 A1 7/2012 Dawson et al.
2012/0200340 A1 8/2012 Shook et al.
2012/0212201 A1 8/2012 Lee
2012/0223773 A1 9/2012 Jones et al.
2012/0243267 A1 9/2012 Kassayan
2012/0249096 A1 10/2012 Enenkel
2012/0249224 A1 10/2012 Wei et al.
2012/0250360 A1 10/2012 Orr et al.
2012/0252382 A1 10/2012 Bashir et al.
2012/0268030 A1 10/2012 Riesebosch
2012/0313602 A1 12/2012 Perreault et al.
2012/0326684 A1 12/2012 Perreault et al.
2013/0005286 A1 1/2013 Chan et al.
2013/0044519 A1 2/2013 Teraura et al.
2013/0049714 A1 2/2013 Chiu
2013/0049885 A1 2/2013 Rozman et al.
2013/0058049 A1 3/2013 Roth et al.
2013/0058141 A1 3/2013 Oraw et al.
2013/0069614 A1 3/2013 Tso et al.
2013/0094157 A1 4/2013 Giuliano
2013/0106380 A1 5/2013 Marsili et al.
2013/0154491 A1 6/2013 Hawley
2013/0154600 A1 6/2013 Giuliano
2013/0163302 A1 6/2013 Li et al.
2013/0163392 A1 6/2013 Braunberger
2013/0181521 A1 7/2013 Khlat
2013/0187612 A1 7/2013 Aiura
2013/0201729 A1 8/2013 Ahsanuzzaman et al.
2013/0229841 A1 9/2013 Giuliano
2013/0234785 A1 9/2013 Dai et al.
2013/0241625 A1 9/2013 DiGioacchino et al.
2013/0245487 A1 9/2013 Aga
2013/0279224 A1 10/2013 Ofek
2013/0287231 A1 10/2013 Kropfitsch
2013/0293310 A1 11/2013 Levesque et al.
2013/0313904 A1 11/2013 Kayama
2013/0322126 A1 12/2013 Pan et al.
2013/0343106 A1 12/2013 Perreault et al.
2013/0343107 A1 12/2013 Perreault
2014/0015731 A1 1/2014 Khlat et al.
2014/0022005 A1 1/2014 Ramanan et al.
2014/0070787 A1 3/2014 Arno
2014/0091773 A1 4/2014 Burlingame et al.
2014/0092643 A1 4/2014 Luccato
2014/0118065 A1 5/2014 Briffa et al.
2014/0118072 A1 5/2014 Briffa et al.
2014/0120854 A1 5/2014 Briffa et al.
2014/0167513 A1 6/2014 Chang et al.
2014/0167722 A1 6/2014 Lee
2014/0167853 A1 6/2014 Haruna
2014/0177300 A1 6/2014 Lagorce et al.
2014/0184177 A1 7/2014 Tournatory et al.
2014/0266132 A1 9/2014 Low et al.
2014/0268945 A1 9/2014 Low et al.
2014/0313781 A1 10/2014 Perreault et al.
2014/0339918 A1 11/2014 Perreault et al.
2014/0355322 A1 12/2014 Perreault et al.
2015/0002195 A1 1/2015 Englekirk
2015/0023063 A1 1/2015 Perreault et al.
2015/0077175 A1 3/2015 Giuliano
2015/0077176 A1 3/2015 Szczeszynski
2015/0084701 A1 3/2015 Perreault et al.
2015/0255547 A1 9/2015 Yuan et al.
2015/0295497 A1 10/2015 Perreault et al.
2015/0318851 A1 11/2015 Roberts et al.
2015/0326113 A1 11/2015 Szczeszynski
2016/0028302 A1 1/2016 Low et al.
2017/0285679 A1 10/2017 Szczeszynski
2018/0006554 A1 1/2018 Giuliano

FOREIGN PATENT DOCUMENTS

CN 1057410 C 10/2000
CN 1452306 A 10/2003
CN 1483204 A 3/2004
CN 1728518 A 2/2006
CN 1761136 A 4/2006
CN 1825485 A 8/2006
CN 1988349 A 6/2007
CN 101009433 A 8/2007
CN 101034536 A 9/2007
CN 101071981 A 11/2007
CN 101079576 A 11/2007
CN 101174789 A 5/2008
CN 101286696 A 10/2008
CN 101297465 A 10/2008
CN 101399496 4/2009
CN 101447753 A 6/2009
CN 101563845 A 10/2009
CN 101588135 A 11/2009
CN 101611531 A 12/2009
CN 101636702 A 1/2010
CN 101647181 A 2/2010
CN 101647182 A 2/2010
CN 101662208 A 3/2010
CN 101707437 A 5/2010
CN 101765963 A 6/2010
CN 101931204 A 12/2010
CN 101976953 A 2/2011
CN 101997406 A 3/2011
CN 102055328 A 5/2011
CN 102118130 A 7/2011
CN 102171918 A 8/2011
CN 102185484 A 9/2011
CN 102210102 10/2011
CN 102480291 A 5/2012
CN 102769986 A 11/2012
CN 110277908 12/2012
CN 115580109 12/2012
CN 102904436 A 1/2013
CN 103178711 A 6/2013
CN 103275753 A 9/2013
CN 103636288 A 3/2014
CN 103650313 A 3/2014
CN 103650314 A 3/2014

(56) References Cited

FOREIGN PATENT DOCUMENTS

| | | | |
|---|---|---|---|
| CN | 103975433 | A | 8/2014 |
| CN | 104011985 | A | 8/2014 |
| CN | 105229908 | A | 1/2016 |
| CN | 105723599 | | 6/2016 |
| CN | 105874398 | | 8/2016 |
| CN | 10896442 | A | 12/2018 |
| CN | 108964442 | A | 12/2018 |
| DE | 2705597 | A1 | 8/1977 |
| DE | 3347106 | A1 | 7/1985 |
| DE | 10358299 | A1 | 7/2005 |
| DE | 112012005353 | | 12/2012 |
| DE | 112013006828 | T5 | 3/2016 |
| DE | 112014004225 | | 6/2016 |
| DE | 112014004237 | | 6/2016 |
| EP | 0513920 | A2 | 11/1992 |
| EP | 0773622 | A2 | 5/1997 |
| EP | 1199788 | A1 | 4/2002 |
| EP | 1635444 | B1 | 3/2006 |
| EP | 1750366 | A2 | 2/2007 |
| EP | 2469694 | | 6/2012 |
| EP | 2469694 | A1 | 6/2012 |
| EP | 2705597 | A2 | 3/2014 |
| EP | 2705597 | B1 | 8/2018 |
| EP | 3425784 | A1 | 1/2019 |
| FR | 2852748 | A1 | 9/2004 |
| GB | 2232830 | A | 12/1990 |
| GB | 2512259 | | 12/2012 |
| GB | 2505371 | A | 2/2014 |
| GB | 2526492 | | 11/2015 |
| GB | 2526492 | A | 11/2015 |
| GB | 2532686 | | 5/2016 |
| GB | 2534716 | | 8/2016 |
| GB | 2587732 | | 4/2021 |
| GB | 2588878 | | 5/2021 |
| GB | 2589040 | | 5/2021 |
| JP | H05191970 | A | 7/1993 |
| JP | H0787682 | A | 3/1995 |
| JP | 09135567 | A | 5/1997 |
| JP | 10327573 | | 12/1998 |
| JP | 10327575 | A | 12/1998 |
| JP | 11235053 | | 8/1999 |
| JP | H11235053 | A | 8/1999 |
| JP | 2000060110 | A | 2/2000 |
| JP | 2000134095 | A | 5/2000 |
| JP | 2002062858 | A | 2/2002 |
| JP | 2002506609 | A | 2/2002 |
| JP | 2002233139 | A | 8/2002 |
| JP | 2002305248 | A | 10/2002 |
| JP | 2003284324 | A | 10/2003 |
| JP | 3475688 | B2 | 12/2003 |
| JP | 200418355 | A | 7/2004 |
| JP | 2006025592 | A | 1/2006 |
| JP | 2006050833 | A | 2/2006 |
| JP | 2006067783 | A | 3/2006 |
| JP | 2007215320 | A | 8/2007 |
| JP | 2008118517 | A | 5/2008 |
| JP | 2008220001 | A | 9/2008 |
| JP | 2009022093 | A | 1/2009 |
| JP | 2009513098 | A | 3/2009 |
| JP | 2009165227 | A | 7/2009 |
| JP | 2010045943 | | 2/2010 |
| JP | 2010045943 | A | 2/2010 |
| JP | 2010521943 | A | 6/2010 |
| JP | 2012157211 | A | 8/2012 |
| JP | 2013034298 | A | 2/2013 |
| JP | 2013065939 | A | 4/2013 |
| JP | 5297116 | B2 | 9/2013 |
| JP | 2014212654 | A | 11/2014 |
| KR | 1019990002891 | A | 1/1999 |
| KR | 20000052068 | A | 8/2000 |
| KR | 1020100023304 | A | 3/2010 |
| KR | 1020100138146 | A | 12/2010 |
| KR | 1020110053681 | A | 5/2011 |
| KR | 1020110061121 | A | 6/2011 |
| KR | 1020120010636 | A | 2/2012 |
| KR | 1020140103351 | | 12/2012 |
| KR | 1020130066266 | A | 6/2013 |
| KR | 102014005528 | A | 2/2014 |
| KR | 1020140015528 | A | 2/2014 |
| KR | 1020140033577 | A | 3/2014 |
| KR | 1020150085072 | A | 7/2015 |
| KR | 101556838 | B1 | 10/2015 |
| KR | 1020150132530 | | 11/2015 |
| KR | 20160056912 | | 5/2016 |
| KR | 20160056913 | | 5/2016 |
| KR | 1020200077607 | | 6/2020 |
| KR | 20220098263 | | 7/2022 |
| TW | 200701608 | A | 1/2007 |
| TW | 201526493 | | 7/2015 |
| TW | 201530997 | | 8/2015 |
| WO | WO2004047303 | A1 | 6/2004 |
| WO | 2006093600 | | 9/2006 |
| WO | WO2007136919 | A2 | 11/2007 |
| WO | WO2009012900 | A1 | 1/2009 |
| WO | 2009112900 | | 9/2009 |
| WO | WO2010056912 | | 5/2010 |
| WO | WO2011089483 | A1 | 7/2011 |
| WO | WO2012085598 | A2 | 6/2012 |
| WO | 2012151466 | | 11/2012 |
| WO | 2013059446 | | 4/2013 |
| WO | 2013096416 | | 6/2013 |
| WO | WO2013086445 | A1 | 6/2013 |
| WO | WO2014070998 | A1 | 5/2014 |
| WO | WO2014143366 | A1 | 9/2014 |
| WO | WO2015039077 | | 3/2015 |
| WO | WO2015039079 | | 3/2015 |

OTHER PUBLICATIONS

Makowski, "Performance Limits of Switched-Capacitor DC-DC Converters", IEEE PESC'95 Conference, 1995.

Texas Instruments data sheet for part TPS54310, "3-V to 6-V input, 3-A output synchronous-buck PWM switcher with integrated FETs", dated 2002-2005.

Cao—"Multiphase Multilevel Modular DC-DC Converter for High-Current High-Gain TEG Application" IEEE Transactions on Industry Applications, vol. 47, No. 3, May/Jun. 1991, pp. 1400-1408, 9 pages.

Xu et al., "Voltage Divider and its Application in Two-stage Power Architecture," IEEE Twenty-First Annual IEEE Applied Power Electronics Conference and Exposition, pp. 499-504, Mar. 2006.

Ottman et al., "Optimized Piezoelectric Energy Harvesting Circuit using Step-Down Converter in Discontinuous Conduction Mode", IEEE Power Electronics Specialists Conference, pp. 1988-1994, 2002.

Starzyk et al., "A DC-DC Charge Pump Design Based on Voltage Doublers," IEEE Transactions on Circuits and Systems—I: Fundamental Theory and Applications, vol. 48, No. 3, Mar. 2001, pp. 350-359.

Linear Technology data sheet for part LTC3402, "2A, 3MHz Micropower Synchronous Boost Converter", 2000.

Andreassen—"Digital Variable Frequency Control for Zero Voltage Switching and Interleaving of Synchronous Buck Converters" 12th Intl. Power Electronics and Motion Control Conference, IEEE Aug. 2006, pp. 184-188, 5 pages.

Ma et al., "Design and Optimization of Dynamic Power System for Self-Powered Integrated Wireless Sensing Nodes" ACM ISLPED '05 conference (published at pp. 303-306 of the proceedings).

Wai-Shan Ng, et al., "Switched Capacitor DC-DC Converter: Superior where the Buck Converter has Dominated", Electrical Engineering and Computer Sciences University of California at Berkeley, Technical Report No. UCB/EECS-2011-94, http://www.eecs.berkeley.edu/Pubs/TechRpts/2011/EECS-2011-94.html, Aug. 17, 2011, 141 pgs.

Pal Andreassen et al, Digital Variable Frequency Control for Zero Voltage Switching and Interleaving of Synchronous Buck Converters, 12th International Power Electronics and Motion Control Conference, Aug. 1, 2006, IEEE, Pi Publication date: Aug. 1, 2006.

Dong Cao, Fang Zheng Peng, Multiphase Multilevel Modular DC DC Converter for High-Current High-Gain TEG Application, vol.

(56) References Cited

OTHER PUBLICATIONS

47, No. 3,IEEE Transactions on Industry Applications., May 1, 2011, IEEE Service Center, Piscataway, NJ., US, Publication date:May 1, 2011.
Luo et al., "Investigation of switched-capacitorized DC/DC converters," 2009 IEEE 6th International Power Electronics and Motion Control Conference, Wuhan, China, May 17-20, 2009, pp. 1270-1276, doi: 10.1109/IPEMC.2009.5157581.
U.S. Appl. No. 16/919,033: Amended Application Data Sheet filed Jul. 2, 2020, 7 pages.
Cheng, "New generation of switched capacitor converters," PESC 98 Record. 29th Annual IEEE Power Electronics Specialists Conference (Cat. No. 98CH36196), Fukuoka, Japan, May 22, 1998, pp. 1529-1535 vol. 2, doi: 10.1109/PESC.1998.703377.
Cervera et al. "A High Efficiency Resonant Switched Capacitor Converter with Continuous Conversion Ratio," Energy Conversion Congress and Exposition (ECCE), Sep. 2013, pp. 4969-4976.
Y. Lei, R. May and R. Pilawa-Podgurski, "Split-Phase Control: Achieving Complete Soft-Charging Operation of a Dickson Switched-Capacitor Converter," in IEEE Transactions on Power Electronics, vol. 31, No. 1, pp. 770-782, Jan. 2016, doi: 10.1109/TPEL.2015.2403715.
Alon Cervera et al. A high efficiency resonant switched capacitor converter with continuous conversion ratio' Energy Conversion Congress and Exposition, IEEE, 2013, pp. 4969-4976.
U.S. Appl. No. 61/380,522, Chris Levesque et al., filed Sep. 7, 2010.
U.S. Appl. No. 61/417,633, Chris Levesque et al., filed Nov. 29, 2010.
Xiaoguo Liang et al, Evaluation of Narrow Vdc-Based Power Delivery Architecture in Mobile Computing System, IEEE Transactions on Industry Applications., Nov. 1, 2011, IEEE Service Center, Piscataway, NJ., US, Dec. 1, 2011.
Xiaoguo Liang et al., "Evaluation of Narrow Vdc-Based Power Delivery Architecture in Mobile Computing System," IEEE Transactions on Industry, Dec. 1, 2011.
Yeung, "Multiple Fractional Voltage Conversion Ratios for Switched Capacitor Resonant Converters", Jun, 1, 2001.
David Giuliano, "Miniaturized, low-voltage power converters with fast dynamic response" Thesis (Ph. D.)—Massachusetts Institute of Technology, Department of Electrical Engineering and Computer Science, Sep. 2013.
Abutbul—"Step-Up Switching-Mode Converter with High Voltage Gain Using a Switched-Capacitor Circuit" IEEE Transactions on Circuits and Systems I, vol. 50, pp. 1098-1102, Aug. 2003, Doc 7587.
Axelrod—"Single-switch single stage switched-capacitor buck converter", Proc. Of Norpie 2004, 4th Nordic Workshop on Power and Industrial Electronics, Jun. 2004, Doc 7588.
Han—"A New Approach to Reducing Outpur Ripple in Switched-Capacitor-Based Step-Down DC-DC Converters" IEEE Transactions on Power Electronics, vol. 21, No. 6, pp. 1548-1555, Nov. 2006, Doc 7589.
Lei—"Analysis of Switched-Capacitor DC-DC Converters in Soft-Charging Operation" 14th IEEE Workshop on Control and Modeling for Power Electronics, p. 1-7, Jun. 23, 2013, Doc 7590.
Meynard—"Multi-Level Conversion: High Voltage Choppers and Voltage-Source Inverters" IEEE Power Electronics Specialists Conference pp. 397-403, 1992, Doc 7591.
Middlebrook—"Transformerless DC-to-DC Converters with Large Conversion Ratios" IEEE Transactions on Power Electronics, vol. 3, No. 4, pp. 484-488, Oct. 1988, Doc 7592.
Ng—"Switched Capacitor DC-DC Converter: Superior where the Buck Converter has Dominated" PhD Thesis, UC Berkeley, Aug. 17, 2011, Doc 7593.
Pilawa-Podgurski—"Merged Two-Stage Power Converter Architecture with Soft Charging Switched-Capacitor Energy Transfer" 39th IEEE Power Electronics Specialists Conference, 2008, Doc 7594.
Pilawa-Podgurski—"Merged Two-Stage Power Converter with Soft Charging Switched-Capacitor Stage in 180 nm CMOS" IEEE Journal of Solid-State Circuits, vol. 47, No. 7, pp. 1557-1567, Jul. 2012, Doc 7595.
Sun—"High Power Density, High Efficiency System Two-Stage Power Architecture for Laptop Computers" Power Electronic Specialists Conference, pp. 1-7, Jun. 2006, Doc 7596.
Umeno—"A New Approach to Low Ripple-Noise Switching Converters on the Basis of Switched-Capacitor Converters" IEEE Intl. Symposium on Circuits and Systems, vol. 2, pp. 1077-1080, Jun. 1991, Doc 7597.
Wood—"Design, Fabrication and Initial Results of a 2g Autonomous Glider" IEEE Industrial Electronics Society, pp. 1870-1877, Nov. 2005, Doc 7598.
U.S. Appl. No. 14/027,584 / 400.P012: US Patent Application filed Sep. 16, 2013, 43 pages (30096-012001), Doc 7413.
U.S. Appl. No. 14/027,584 / 400.P012: Filing Receipt dated Oct. 10, 2013, 3 pages (30096-012001), Doc 7427.
U.S. Appl. No. 14/027,584 / 400.P012: Restriction Requirement dated Jan. 17, 2014, 6 pages (30096-012001), Doc 7436.
U.S. Appl. No. 14/027,584 / 400.P012: Response to Restriction Requirement filed Mar. 17, 2014, 6 pages (30096-012001), Doc 7437.
U.S. Appl. No. 14/027,584 / 400.P012: Non-final Office Action dated Apr. 17, 2014, 9 pages (30096-012001), Doc 7438.
U.S. Appl. No. 14/027,584 / 400.P012: Response to Non-final Office Action filed Jun. 24, 2014, 45 pages (30096-012001), Doc 7439.
U.S. Appl. No. 14/027,584 / 400.P012: Final Office Action dated Jul. 28, 2014, 10 pages (30096-012001), Doc 7440.
U.S. Appl. No. 14/027,584 / 400.P012: Response to Final Office Action filed Aug. 19, 2014, 10 pages (30096-012001), Doc 7441.
U.S. Appl. No. 14/027,584 / 400.P012: Advisory Action dated Aug. 29, 2014, 4 pages (30096-012001), Doc 7442.
U.S. Appl. No. 14/027,584 / 400.P012: RCE and Amendment filed Oct. 24, 2014, 19 pages (30096-012001), Doc 7443.
U.S. Appl. No. 14/027,584 / 400.P012: Non-final Office Action dated Mar. 12, 2015, 1O pages (30096-012001), Doc 7444.
U.S. Appl. No. 14/027,584 / 400.P012: Notice of Publication dated Mar. 19, 2015, 1 page (30096-012001), Doc 7445.
U.S. Appl. No. 14/027,584 / 400.P012: Response to Non-final Office Action dated Jun. 12, 2015, 30 pages (30096-012001), Doc 7446.
U.S. Appl. No. 14/027,584 / 400.P012: Final Office Action dated Jul. 2, 2015, 12 pages (30096-012001), Doc 7447.
U.S. Appl. No. 14/027,584 / 400.P012: Final Office Action dated Aug. 27, 2015, 12 pages (30096-012001), Doc 7448.
U.S. Appl. No. 14/027,584 / 400.P012: Applicant Initialed Interview Summary dated Sep. 2, 2015, 3 pages (30096-012001), Doc 7449.
U.S. Appl. No. 14/027,584 / 400.P012: Applicant Initialed Interview Summary, 312 Amendment, and Decision on After Final Consideration Decision dated Sep. 11, 2015, 4 pages (30096-012001), Doc 7450.
U.S. Appl. No. 14/027,584 / 400.P012: Advisory Action dated Sep. 11, 2015, 5 pages (30096-012001), Doc 7451.
U.S. Appl. No. 14/027,584 / 400.P012: Notice of Appeal and Pre-Brief Conference Request filed Oct. 2, 2015, 11 pages (30096-012001), Doc 7452.
U.S. Appl. No. 14/027,584 / 400.P012: Replacement Drawing filed Oct. 5, 2015, 11 pages (30096-012001), Doc 7453.
U.S. Appl. No. 14/027,584 / 400.P012: Final Office Action dated Nov. 12, 2015, 14 pages (30096-012001), Doc 7454.
U.S. Appl. No. 14/027,584 / 400.P012: Response to Final Office Action dated Nov. 30, 2015, 13 pages (30096-012001), Doc 7455.
U.S. Appl. No. 14/027,584 / 400.P012: Advisory Action, Applicant Initialed Interview Summary, and 312 Amendment Initialed by Examiner dated Dec. 10, 2015, 9 pages (30096-012001), Doc 7456.
U.S. Appl. No. 14/027,584 / 400.P012: Notice of Appeal and Pre-Brief Conference Request filed Feb. 11, 2016, 9 pages (30096-012001), Doc 7457.
U.S. Appl. No. 14/027,584 / 400.P012: Pre-Brief Conference Decision dated May 9, 2016, 2 pages (30096-012001), Doc 7458.

(56) References Cited

OTHER PUBLICATIONS

U.S. Appl. No. 14/027,584 / 400.P012: RCE and Amendment filed Jun. 9, 2016, 16 pages (30096-012001), Doc 7459.
U.S. Appl. No. 14/027,584 / 400.P012: Notice of Non-Compliant Amendment dated Jun. 17, 2016, 2 pages (30096-012001), Doc 7460.
U.S. Appl. No. 14/027,584 / 400.P012: Amendment and Response to Notice of Non-Compliant Amendment filed Jul. 6, 2016, 12 pages (30096-012001), Doc 7461.
U.S. Appl. No. 14/027,584 / 400.P012: Non-final Office Action dated Sep. 28, 2016, 13 pages (30096-012001), Doc 7462.
U.S. Appl. No. 14/027,584 / 400.P012: Response to Non-final Office Action filed Dec. 28, 2016, 13 pages (30096-012001), Doc 7463.
U.S. Appl. No. 14/027,584 / 400.P012: Final Office Action dated Feb. 7, 2017, 8 pages (30096-012001), Doc 7464.
U.S. Appl. No. 14/027,584 / 400.P012: Response to Final Office Action dated Apr. 7, 2017, 11 pages (30096-012001), Doc 7465.
U.S. Appl. No. 14/027,584 / 400.P012: Notice of Allowance and Allowability dated Apr. 17, 2017, 16 pages (30096-012001), Doc 7466.
U.S. Appl. No. 14/027,584 / 400.P012: Issue Fee Payment filed Jul. 14, 2017, 6 pages (30096-012001), Doc 7467.
U.S. Appl. No. 14/027,584 / 400.P012: Issue Notification dated Aug. 2, 2017, 6 pages (30096-012001), Doc 7468.
U.S. Appl. No. 15/650,101 / 400.P012C: Patent Application filed Jul. 14, 2017, 29 pages (30096-012002), Doc 7469.
U.S. Appl. No. 15/650,101 / 400.P012C: Filing Receipt and Notice to Fie Missing Parts dated Jul. 24, 2017, 6 pages (30096-012002), Doc 7470.
U.S. Appl. No. 15/650,101 / 400.P012C: Preliminary Amendment and Response to Notice to Fie Missing Parts filed Sep. 25, 2017, 12 pages (30096-012002), Doc 7471.
U.S. Appl. No. 15/650,101 / 400.P012C: Updated Filing Receipt dated Sep. 27, 2017, 4 pages (30096-012002), Doc 7472.
U.S. Appl. No. 15/650,101 / 400.P012C: Request to Update Name of Applicant filed Oct. 3, 2017, 18 pages (30096-012002), Doc 7473.
U.S. Appl. No. 15/650,101 / 400.P012C: Replacement Filing Receipt dated Oct. 5, 2017, 3 pages (30096-012002), Doc 7474.
U.S. Appl. No. 15/650,101 / 400.P012C: Notice of Publication dated Jan. 4, 2018, 1 page (30096-012002), Doc 7475.
U.S. Appl. No. 15/650,101 / 400.P012C: Request to Change Name of Applicant filed Feb. 27, 2018, 10 pages (30096-012002), Doc 7476.
U.S. Appl. No. 15/650,101 / 400.P012C: Non-final Office Action dated Jul. 19, 2018, 12 pages (30096-012002), Doc 7477.
U.S. Appl. No. 15/650,101 / 400.P012C: Response to Non-final Office Action, Terminal Disclaimer and Request to Change Applicant filed Oct. 19, 2018, 47 pages (30096-012002), Doc 7478.
U.S. Appl. No. 15/650,101 / 400.P012C: Supplemental Amendment filed Oct. 26, 2018, 47 pages (30096-012002), Doc 7479.
U.S. Appl. No. 15/650,101 / 400.P012C: Final Office Action dated Nov. 5, 2018, 16 pages (30096-012002), Doc 7480.
U.S. Appl. No. 15/650,101 / 400.P012C: Response to Final Office Action filed Jan. 7, 2019, 40 pages (30096-012002), Doc 7481.
U.S. Appl. No. 15/650,101 / 400.P012C: Corrected Filing Receipt dated Jan. 9, 2019, 3 pages (30096-012002), Doc 7482.
U.S. Appl. No. 15/650,101 / 400.P012C: Advisory Action dated Jan. 28, 2019, 4 pages (30096-012002), Doc 7483.
U.S. Appl. No. 15/650,101 / 400.P012C: Notice of Abandonment dated Oct. 8, 2019, 2 pages (30096-012002), Doc 7484.
PCT/US14/55796 / 400.P012PCT: PCT Application filed Sep. 16, 2014, 29 pages (400-012WO1), Doc 7485.
PCT/US14/55796 / 400.P012PCT: Intl. Search Report and Written Opinion dated Jan. 2, 2015, 15 pages (400-012WO1), Doc.
PCT/US14/55796 / 400.P012PCT: Intl. Preliminary Report on Patentability dated Mar. 22, 2016, 7 pages (400-012WO1), Doc 7499.
CN201480062822 / 400.P012PCTCN: CN Patent Application filed May 16, 2016, 53 pages (30096-012CN1), Doc 7488.
CN201480062822 / 400.P012PCTCN: First Office Action dated Jan. 18, 2017, 22 pages (30096-012CN1), Doc 7489.
CN201480062822 /400.P012PCTCN: Response to First Office Action filed Aug. 2, 2017, 10 pages (30096-012CN1), Doc 7491.
CN201480062822 / 400.P012PCTCN: Second Office Action dated Nov. 16, 2017, 10 pages (30096-012CN1), Doc 7490.
CN201480062822 / 400.P012PCTCN: Notice of Abandonment/ Deemed Withdrawn dated Mar. 7, 2018, 1page (30096-012CN1), Doc 7492.
DE112014004225 / 400.P012PCTDE: DE Application filed Mar. 16, 2016, 53 pages (30096-012DE1), Doc 7494.
GB1604216 / 400.P012PCTGB: GB Application filed Mar. 11, 2016, 24 pages (30096-012GB1), Doc 7495.
GB1604216 / 400.P012PCTGB: Notice of Publication dated Apr. 25, 2016, 2 pages (30096-012GB1), Doc 7496.
GB1604216 / 400.P012PCTGB: Examination Report Under Section 18(3) dated Jun. 22, 2020, 3 pages (30096-012GB1), Doc 7498.
GB1604216 / 400.P012PCTGB: Response to Examination Report Under Section 18(3) and Amendment filed Dec. 21, 2020, 10 pages (30096-012GB1), Doc 7500.
GB1604216 / 400.P012PCTGB: Further Examination Report Under Section 18(3) dated Feb. 1, 2021, 3 pages (30096-012GB1), Doc 7501.
GB1604216 / 400.P012PCTGB: Filing Receipt dated Mar. 18, 2021, 1 page (30096-012GB1), Doc 7502.
GB1604216 / 400.P012PCTGB: Response to Further Examination Report Under Section 18(3) filed Mar. 31, 2021, 12 pages (30096-012GB1), Doc 7503.
GB1604216 / 400.P012PCTGB: Intention to Grant dated Apr. 21, 2021, 2 pages (30096-012GB1), Doc 7613.
GB2104046.4 / 400.P012PCTGBD: GB Application filed Mar. 23, 2021, 26 pages (30096-012GB2), Doc 7504.
KR20167009266 / 400.P012PCTKR: KR Application filed Apr. 7, 2016, 69 pages (30096-012KR1), Doc 7507.
TW103131755 / 400.P012TW: TW Application filed Sep. 15, 2014, 26 pages (30096-012TW1), Doc 7509.
U.S. Appl. No. 14/027,716 / 400.P013: Patent Application filed Sep. 16, 2013, 35 pages (30096-013001), Doc 7510.
U.S. Appl. No. 14/027,716 / 400.P013: Filing Receipt dated Oct. 11, 2013, 3 pages (30096-013001), Doc 7511.
U.S. Appl. No. 14/027,716 / 400.P013: Restriction Requirement dated Jan. 16, 2014, 6 pages (30096-013001), Doc 7512.
U.S. Appl. No. 14/027,716 / 400.P013: Response to Restriction Requirement dated Jan. 16, 2014, 3 pages (30096-013001), Doc 7513.
U.S. Appl. No. 14/027,716 / 400.P013: Non-final Office Action dated Apr. 22, 2014, 10 pages (30096-013001), Doc 7514.
U.S. Appl. No. 14/027,716 / 400.P013: Response to Non-final Office Action filed Jul. 16, 2014, 15 pages (30096-013001), Doc 7515.
U.S. Appl. No. 14/027,716 / 400.P013: Final Office Action filed Sep. 3, 2014, 9 pages (30096-013001), Doc 7516.
U.S. Appl. No. 14/027,716 / 400.P013: Letter Restarting Period for Response Sep. 24, 2014, 9 pages (30096-013001), Doc 7517.
U.S. Appl. No. 14/027,716 / 400.P013: Response to Final Office Action filed Oct. 17, 2014, 15 pages (30096-013001), Doc 7518.
U.S. Appl. No. 14/027,716 / 400.P013: Advisory Action filed Oct. 30, 2014, 4 pages (30096-013001), Doc 7519.
U.S. Appl. No. 14/027,716 / 400.P013: Response After Final filed Dec. 23, 2014, 9 pages (30096-013001), Doc 7520.
U.S. Appl. No. 14/027,716 / 400.P013: Notice of Allowance and Allowability dated Jan. 23, 2015, 19 pages (30096-013001), Doc 7521.
U.S. Appl. No. 14/027,716 / 400.P013: Notice of Publication dated Mar. 19, 2015, 1 page (30096-013001), Doc 7522.
U.S. Appl. No. 14/027,716 / 400.P013:Issue Fee Payment filed Apr. 22, 2015, 2 pages (30096-013001), Doc 7523.
U.S. Appl. No. 14/027,716 / 400.P013: Issue Notification dated May 6, 2015, 1 page (30096-013001), Doc 7524.
U.S. Appl. No. 14/719,815 / 400.P013C: Patent Application filed May 22, 2015, 41 pages (30096-013002), Doc 7525.

(56) References Cited

OTHER PUBLICATIONS

U.S. Appl. No. 14/719,815 / 400.P013C: Filing Receipt and Notice to File Corrected Application Papers dated Jun. 3, 2015, 5 pages (30096-013002), Doc 7526.
U.S. Appl. No. 14/719,815 / 400.P013C: Amendment and Response to Notice to File Corrected Application Papers filed Jul. 29, 2015, 35 pages (30096-013002), Doc 7527.
U.S. Appl. No. 14/719,815 / 400.P013C: Updated Filing Receipt dated Aug. 5, 2015, 3 pages (30096-013002), Doc 7528.
U.S. Appl. No. 14/719,815 / 400.P013C: Notice of Publication dated Nov. 12, 2015, 3 pages (30096-013002), Doc 7529.
U.S. Appl. No. 14/719,815 / 400.P013C: Preliminary Amendment filed Apr. 12, 2016, 9 pages (30096-013002), Doc 7530.
U.S. Appl. No. 14/719,815 / 400.P013C: Non-final Office Action dated Aug. 23, 2016, 12 pages (30096-013002), Doc 7531.
U.S. Appl. No. 14/719,815 / 400.P013C: Response to Non-final Office Action filed Nov. 22, 2016, 10 pages (30096-013002), Doc 7532.
U.S. Appl. No. 14/719,815 / 400.P013C: Notice of Allowance and Allowability dated Dec. 16, 2016, 20 pages (30096-013002), Doc 7533.
U.S. Appl. No. 14/719,815 / 400.P013C: Amendment and Issue Fee Payment filed Mar. 16, 2017, 15 pages (30096-013002), Doc 7534.
U.S. Appl. No. 14/719,815 / 400.P013C: Examiner Response to 312 Communication and Amendment dated Apr. 3, 2017, 4 pages (30096-013002), Doc 7535.
U.S. Appl. No. 14/719,815 / 400.P013C: Examiner's Amendment dated Apr. 27, 2017, 1 page (30096-013002), Doc 7536.
U.S. Appl. No. 14/719,815 / 400.P013C: Issue Notification dated May 3, 2017, 1 page (30096-013002), Doc 7537.
U.S. Appl. No. 15/460,596 / 400.P013C2: Patent Application filed Mar. 16, 2017, pages (30096-013003), Doc 7538.
U.S. Appl. No. 15/460,596 / 400.P013C2: Filing Receipt and Notice to File Missing Parts dated Mar. 24, 2017, 5 pages (30096-013003), Doc 7539.
U.S. Appl. No. 15/460,596 / 400.P013C2: Preliminary Amendment and Response to Notice to File Missing Parts dated Jun. 26, 2017, 11 pages (30096-013003), Doc 7540.
U.S. Appl. No. 15/460,596 / 400.P013C2: Updated Filing Receipt dated Jun. 28, 2017, 3 pages (30096-013003), Doc 7541.
U.S. Appl. No. 15/460,596 / 400.P013C2: Notice of Publication dated Oct. 5, 2017, 1 page (30096-013003), Doc 7542.
U.S. Appl. No. 15/460,596 / 400.P013C2: Corrected Filing Receipt dated Oct. 6, 2017, 3 pages (30096-013003), Doc 7543.
U.S. Appl. No. 15/460,596 / 400.P013C2: Non-final Office Action dated Jun. 25, 2018, 15 pages (30096-013003), Doc 7544.
U.S. Appl. No. 15/460,596 / 400.P013C2: Response to Non-final Office Action dated Jul. 5, 2018, 28 pages (30096-013003), Doc 7545.
U.S. Appl. No. 15/460,596 / 400.P013C2: Final Office Action dated Aug. 15, 2018, 7 pages (30096-013003), Doc 7546.
U.S. Appl. No. 15/460,596 / 400.P013C2: Amendment, Terminal Disclaimer and Response to Final Office Action dated Sep. 19, 2018, 9 pages (30096-013003), Doc 7547.
U.S. Appl. No. 15/460,596 / 400.P013C2: Notice of Allowance and Allowability dated Oct. 5, 2018, 13 pages (30096-013003), Doc 7548.
U.S. Appl. No. 15/460,596 / 400.P013C2: Corrected Filing Receipt dated Nov. 9, 2018, 3 pages (30096-013003), Doc 7549.
U.S. Appl. No. 15/460,596 / 400.P013C2: Issue Fee Payment filed Nov. 16, 2018, 4 pages (30096-013003), Doc 7550.
U.S. Appl. No. 15/460,596 / 400.P013C2: Issue Notification dated Dec. 5, 2018, 1 page (30096-013003), Doc 7551.
U.S. Appl. No. 17/133,909 / 400.P013C2RE: Patent Application filed Dec. 24, 2020, 44 pages (30096-013004 ), Doc 7552.
U.S. Appl. No. 17/133,909 / 400.P013C2RE: Filing Receipt dated Dec. 29, 2020, 4 pages (30096-013004 ), Doc 7553.
PCT/US14/55809 / 400.P013PCT: PCT Application filed Sep. 16, 2014, 38 pages (30096-013WO1), Doc 7554.
PCT/US14/55809 / 400.P013PCT: Intl. Search Report and Written Opinion dated Mar. 31, 2015, 14 pages (30096-013WO1), Doc 7555.
PCT/US14/55809 / 400.P013PCT: Intl.Preliminary Report on Patentability dated Mar. 31, 2016, 7 pages (30096-013WO1), Doc 7556.
CN201480062695 / 400.P013PCTCN: CN Application filed May 16, 2016, 50 pages (30096-013CN1), Doc 7558.
CN201480062695 / 400.P013PCTCN: Filing Receipt dated Jun. 1, 2016, 2 pages (30096-013CN1), Doc 7560.
CN201480062695 / 400.P013PCTCN: First Office Action dated Nov. 28, 2017, 10 pages (30096-013CN1), Doc 7561.
CN201480062695 / 400.P013PCTCN: Response to First Office Action filed Jun. 12, 2018 (No translation available), 10 pages (30096-013CN1), Doc 7563.
CN201480062695 / 400.P013PCTCN: Second Office Action dated Oct. 15, 2018, 17 pages (30096-013CN1), Doc 7564.
CN201480062695 / 400.P013PCTCN: Response to Second Office Action filed Dec. 29, 2018, 15 pages (30096-013CN1), Doc 7565.
CN201480062695 / 400.P013PCTCN: Third Office Action dated May 8, 2019, 7 pages (30096-013CN1), Doc 7566.
CN201480062695 / 400.P013PCTCN: Response to Third Office Action filed May 8, 2019, 9 pages (30096-013CN1), Doc 7567.
CN201480062695 / 400.P013PCTCN: Notice of Intention to Grant with Allowed Claims dated Aug. 29, 2019, 7 pages (30096-013CN1), Doc 7569.
CN201480062695 / 400.P013PCTCN: Patent Certificate dated Dec. 10, 2019, 4 pages (30096-013CN1), Doc 7570.
CN201911107739 / 400.P013PCTCND: CN Application filed Nov. 13, 2019, 48 pages (30096-013CN2), Doc 7571.
CN201911107739 / 400.P013PCTCND: First Office Action dated Dec. 30, 2020, 20 pages (30096-013CN2), Doc 7573.
DE112014004237 / 400.P013PCTDE: DE Application filed Mar. 16, 2016, 50 pages (30096-013DE1), Doc 7574.
GB1604221.0 / 400.P013PCTGB: GB Application filed Mar. 11, 2016, 25 pages (30096-013GB1), Doc 7576.
GB1604221.0 / 400.P013PCTGB: Examination Report Under Section 18(3) dated Jun. 22, 2020, 2 pages (30096-013GB1), Doc 7578.
GB1604221.0 / 400.P013PCTGB: Response to Examination Report Under Section 18(3) filed Dec. 21, 2020, 7 pages (30096-013GB1), Doc 7579.
GB1604221.0 / 400.P013PCTGB: Further Examination Report Under Section 18(3) dated Feb. 21, 2021, 1 page (30096-013GB1), Doc 7580.
GB1604221.0 / 400.P013PCTGB: Response to Further Examination Report Under Section 18(3) filed Apr. 6, 2021, 14 pages (30096-013GB1), Doc 7586.
GB1604221.0 / 400.P013PCTGB: Intention to Grant dated Apr. 21, 2021, 2 pages (30096-013GB1), Doc 7614.
KR20167009267 / 400.P013PCTKR: KR Patent Application filed Apr. 7, 2016, 68 pages (30096-013KR1), Doc 7582.
KR20167009267 / 400.P013PCTKR: Filing Receipt dated Apr. 7, 2016, 3 pages (30096-013KR1), Doc 7583.
TW103131753 / 400.P013TW: TW Patent Application filed Sep. 15, 2014, 56 pages (30096-013TW1), Doc 7584.

* cited by examiner

CHARGE PUMP WITH TEMPORALLY-VARYING ADIABATICITY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

[This application is a continuation of U.S. application Ser. No. 14/719,815, filed on May 22, 2015, which claims the benefit of the priority date of U.S. application Ser. No. 14/027,716, filed on Sep. 16, 2013, issued as U.S. Pat. No. 9,041,459 on May 26, 2015, the contents of which are hereby incorporated by reference in their entirety] *Notice: More than one reissue application has been filed for the reissue of U.S. Pat. No. 10,162,376. The reissue applications are Reissue application Ser. No. 17/133,909, and the present application filed herewith. This application is a divisional reissue application of U.S. patent application Ser. No. 17/133,909, filed Dec. 24, 2020, which is a broadening reissue of U.S. Pat. No. 10,162,376, issued on Dec. 25, 2018, from U.S. patent application Ser. No. 15/460,596, which is a continuation of U.S. application Ser. No. 14/719,815, filed on May 22, 2015, which claims the benefit of the priority date of U.S. application Ser. No. 14/027,716, filed on Sep. 16, 2013, issued as U.S. Pat. No. 9,041,459 on May 26, 2015, the contents of which are hereby incorporated by reference in their entirety.*

BACKGROUND

This invention relates to adiabatic power conversion, and in particular to configuration and control for partial adiabatic operation of a charge pump.

Various configurations of charge pumps, including Series-Parallel and Dickson configurations, rely on alternating configurations of switch elements to propagate charge and transfer energy between the terminals of the charge pump. Energy losses associated with charge propagation determine the efficiency of the converter.

Referring to FIG. 1, a single-phase Dickson charge pump 100 is illustrated in a step-down mode coupled to a low-voltage load 110 and a high-voltage source 190. In the illustrated configuration, generally the low-voltage load 110 is driven (on average) by a voltage that is ⅕ times the voltage provided by the source and a current that is five times the current provided by the high-voltage source 190. The pump is driven in alternating states, referred to as state one and state two, such that the switches illustrated in FIG. 1 are closed in the indicated states. In general, the duration of each state is half of a cycle time T and the corresponding switching frequency of the charge pump 100 is equal to the inverse of the cycle time T.

FIGS. 2A-B illustrate the equivalent circuit in each of states two and state one, respectively, illustrating each closed switch as an equivalent resistance R. Capacitors C1 through C4 have a capacitance C. In a first conventional operation of the charge pump 100, the high-voltage source 190 is a voltage source, for example, a twenty-five volt source, such that the low-voltage load 100 is driven by five volts. In operation, the voltage across the capacitors C1 through C4 are approximately five volts, ten volts, fifteen volts, and twenty volts, respectively.

One cause of energy loss in the charge pump 100 relates the resistive losses through the switches (i.e., through the resistors R in FIGS. 2A-B). Referring to FIG. 2A, during state two, charge transfers from the capacitor C2 to the capacitor C1 and from the capacitor C4 to the capacitor C1. The voltages on these pairs of capacitors equilibrate assuming that the cycle time T is sufficiently greater than the time constant of the circuit (e.g., that the resistances R are sufficiently small. Generally, the resistive energy losses in this equilibration are proportional to the time average of the square of the current passing between the capacitors and therefore passing to the low-voltage load 110. Similarly, during state one, the capacitors C3 and C2 equilibrate, the capacitor C4 charges, and the capacitor C1 discharges, also generally resulting in a resistive energy loss that is proportional to the time average of the square of the current passing to the low-voltage load 110.

For a particular average current passing to the load 110, assuming that the load presents an approximately constant voltage, it can be shown than the resistive energy loss decreases as the cycle time T is reduced (i.e., switching frequency is increased). This can generally be understood by considering the impact of dividing the cycle time by one-half, which generally reduces the peak currents in the equilibration by one half, and thereby approximately reduces the resistive energy loss to one quarter. So the resistive energy loss is approximately inversely proportional to the square of the switching frequency.

However, another source of energy loss relates to capacitive losses in the switches, such that energy loss grows with the switching frequency. Generally, a fixed amount of charge is lost with each cycle transition, which can be considered to form a current that is proportional to the switching frequency. So this capacitive energy loss is approximately proportional to the square of the switching frequency.

Therefore, with a voltage source and load there an optimal switching frequency that minimizes the sum of the resistive and capacitive energy losses, respectively reduced with increased frequency and increased with increased frequency.

SUMMARY

Patent Publication WO 2012/151466, published on Nov. 8, 2012, describes configurations in which the source and/or load comprise regulating circuits. In particular, in FIGS. 1 and 2A-B, the load 110 can effectively comprise a current sink rather than present a constant voltage in an example of what is referred to as "adiabatic" operation of a charge pump. If the current sink accepts constant current, then the currents illustrated in FIG. 2A effectively remain substantially constant values during the illustrated state. Therefore, the resistive power loss is lower than the resistive loss in the voltage driven case discussed in the Background, and also substantially independent of the cycle time T. In situations in which the load sinks a pulsed current, then for a particular average current, the resistive energy loss generally increases as the duty cycle of the current decreases (and the peak current increases). There is a range of low duty cycles in which the resistive losses with a pulsed current exceed the losses for the same average current that would result from the charge pump driving a relatively constant output voltage, for example, across a large output capacitor.

In one aspect, in general, operation of a charge pump is controlled to optimize power conversion efficiency by using an adiabatic mode with some operating characteristics and a non-adiabatic mode with other characteristics. The control is implemented by controlling a configurable circuit at the output of the charge pump.

In another aspect, in general, operation of a charge pump is controlled so that resistive power losses are minimized by using an adiabatic mode with relatively high duty cycle (i.e., relatively high output current) and using a non-adiabatic mode with relative low duty cycle (e.g., relatively low output current). In some examples, mode is selected by selectively introducing a compensation capacitor at the output of the charge pump to present a substantially constant voltage.

In another aspect, in general, an apparatus a charge pump and a controller coupled to the charge pump. The charge pump has a plurality of switch elements arranged to operate in a plurality cycles, with each cycle being associated with a different configuration of the switch elements. The switch elements are configured to provide charging and discharging paths for a plurality of capacitive elements. The controller has an output for controlling timing of the cycles of the charge pump and one or more sensor inputs for accepting sensor signals charactering operation of the charge pump and/or operation of peripheral circuits coupled to the charge pump. The controller is configured adjust the timing of the cycles of the charge pump according variation of the one or more sensor inputs within cycles of operation of the charge pump.

In another aspect, in general, an apparatus includes a switched capacitor charge pump configured to provide a voltage conversion between terminals including a high voltage terminal and a low voltage terminal. The apparatus also includes a compensation circuit coupled to a first terminal of the charge pump for driving a load by the charge pump, the compensation circuit providing a capacitance configurably couplable to the first terminal of the charge pump. A controller is coupled to charge pump and the configurable circuit, and has an output for configuring the compensation circuit, and one or more sensor inputs for accepting sensor signals charactering operation of the charge pump and/or operation of peripheral circuits coupled to the charge pump. The controller is configured to configure the compensation circuit according to the sensor signals to affect efficiency of power conversion between a power source coupled to the charge pump and the load coupled to the charge pump via the configurable circuit.

Aspects may include one or more of the following features.

The controller is configured to couple a selected capacitance to the first terminal to optimize an efficiency of the power conversion.

The one or more sensor signals include a sensor signal that characterizes time variation of a current passing to or from the charge pump via the compensation circuit. In some examples, the sensor signal characterizes a duty cycle of a pulsed current passing to or from the charge pump. In some examples, this current passing to or from the charge pump via the compensation circuit is a current passing between the compensation circuit and a peripheral coupled to the charge pump via the compensation circuit.

The one or more sensor signals include a sensor signal that characterizes a voltage at at least one of the terminals of the charge pump and at the peripheral circuit coupled to the charge pump.

The one or more sensor signals include a sensor signal that characterizes switching frequency of the charge pump.

The controller is configured to determine an operating mode from the sensor signals, and to determine the configuration of the compensation circuit according to the determined mode.

The controller is configured to identify at least a mode having fast switching limit operation of the charge pump and a pulsed current load, and increase the capacitance coupled to the first terminal in said mode.

The controller is configured to identify at least a mode having slow switching limit operation of the charge pump and a pulsed current load with a duty cycle less than a threshold duty cycle, and increase the capacitance coupled to the first terminal in said mode.

The apparatus further includes a peripheral circuit that includes a regulator coupled to the compensation circuit. The regulator provides a current-based load via the compensation circuit to charge pump. The controller is configured to determining a configuration of the compensation circuit according to an efficiency of power conversion performed by the charge pump. In some examples, the regulator comprises a Buck converter. In some examples, the charge pump comprises a Series-Parallel charge pump. In some examples, the charge pump comprises a Dickson charge pump.

In another aspect, in general, a method is directed to power regulation using a charge pump coupled to a load using a compensation circuit coupled to a terminal of the charge pump. The method includes configuring a capacitance provided by the compensation circuit to a first terminal of the charge pump. The capacitance is selected according to the sensor signals to affect efficiency of power conversion between a power source coupled to the charge pump and the load coupled to the charge pump via the configurable circuit.

The method may include acquiring the sensor signals. The sensor signals may characterize one or more a time variation of a current passing to or from the charge pump via the compensation circuit, a duty cycle of a current passing between the compensation circuit and a peripheral circuit, a voltage at the first terminal of the charge pump, and a voltage at the peripheral circuit coupled to the charge pump.

One advantage of one or more embodiments is that efficient operation is maintained in varying operating modes of the power converter.

Another advantage of one or more embodiments is that a controller does not have to be preconfigured for a particular use of a charge pump and can adapt to the circuit in which the pump is embedded without further configuration. For example, the controller can adapt to the size of pump capacitors used, type of regulator coupled to the pump, switching frequency of the pump and/or regulator, etc.

Other features and advantages of the invention are apparent from the following description, and from the claims.

DESCRIPTION

Figure 1:
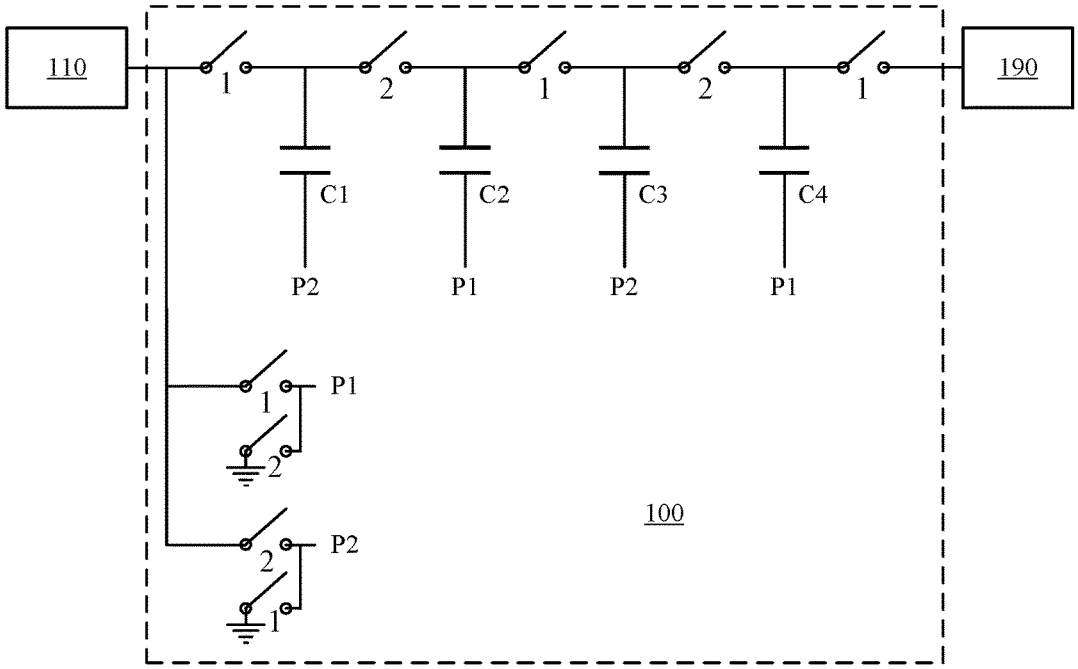
FIG. 1 is a single-phase 1:5 Dickson charge pump.
Figure 2A:
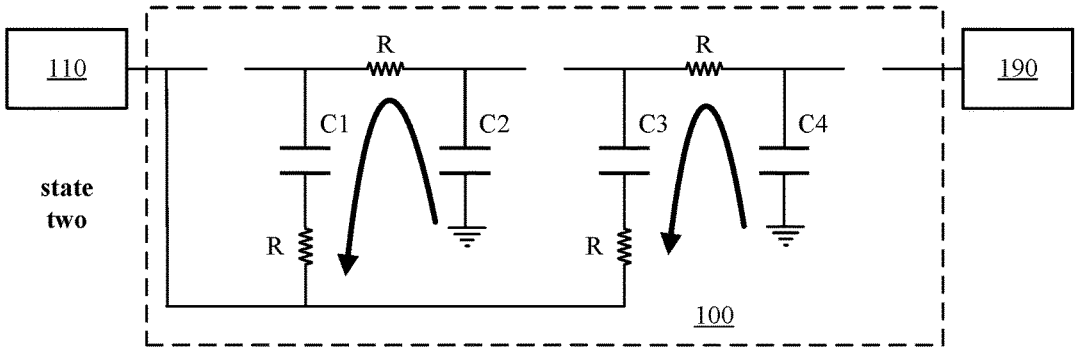
FIGS. 2A-B are equivalent circuits of the charge pump of FIG. 1 in two states of operation.
Figure 2B:
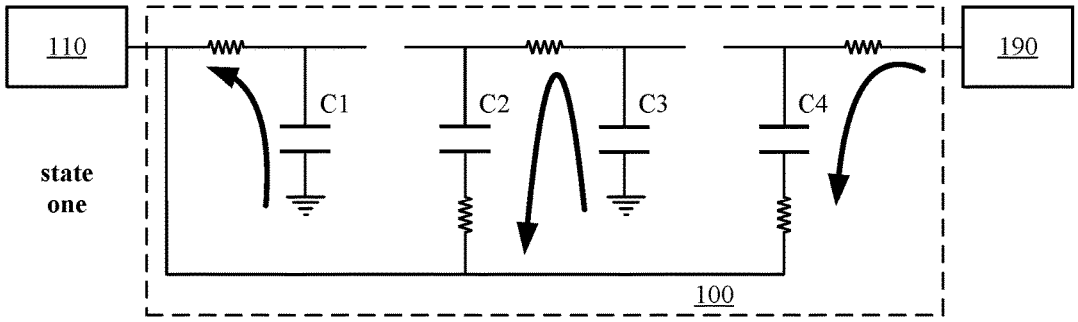

As introduced above, as one example, a charge pump 100 illustrated in FIG. 1 may be operated in an "adiabatic" mode in which one or both of a low-voltage peripheral 110 and a high-voltage peripheral 190 may comprise a current source. For example, Patent Publication WO 2012/151466, published on Nov. 8, 2012, and incorporated herein by reference, describes configurations in which the source and/or load comprise regulating circuits. In particular, in FIGS. 1 and 2A-B, the low-voltage load 110 can effectively comprise a current source rather than a voltage source in an example of what is referred to as "adiabatic" operation of a charge pump. If the current source maintains a constant current from the charge pump, then currents illustrated in FIG. 2A maintain substantially constant values during the illustrated state. Therefore, the resistive losses in the switches through which the current passes are lower than the resistive loss in the voltage load case, and also substantially independent of the switching frequency and the cycle time T. As in the voltage driven case, there capacitive losses in the switches grow with increasing switching frequency, which suggests that lowering the switching frequency is desirable. However, other factors, which may depend on internal aspects of the charge pump, voltage or current characteristics at the terminals of the charge pump, and/or internal aspects of the peripheral elements, such as the source and/or load, may limit the cycle time (e.g., impose a lower limit on the switching frequency).

Figure 3:
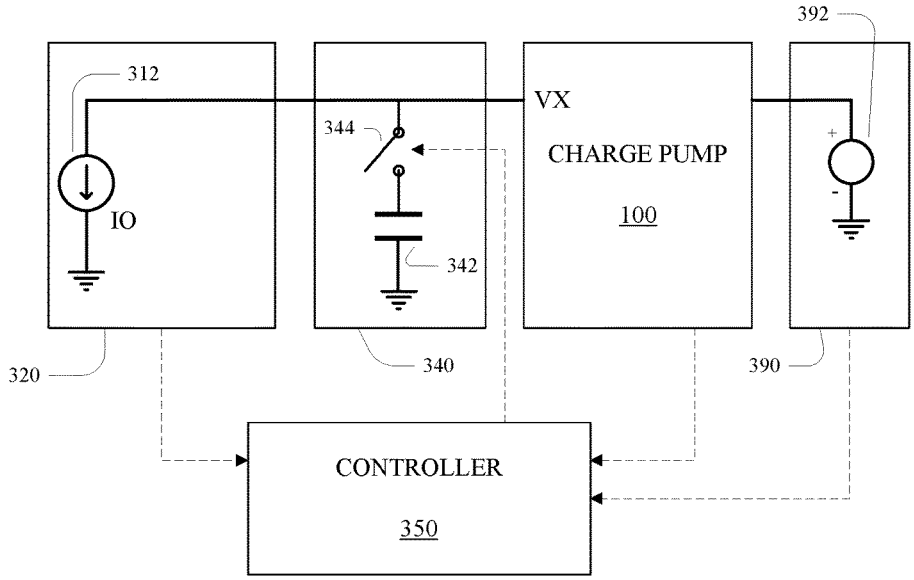
FIGS. 3 and 4 are circuits having a switchable compensating circuit coupled to the charge pump.

Referring to FIG. 3, in a first mode of operation, a load 320 can be considered to comprise a constant current source 312 with an output current IO. In some implementations, the load 320 also includes an output capacitor, which for the analysis below can be considered to be small enough such that current passing to the load 320 can be considered to be substantially constant. As introduced above with reference to FIGS. 2A-B, the charge transfer between capacitors in the charge pump 100 during the alternating states of operation of the charge pump 100 are therefore substantially constant in the adiabatic mode of operation.

Continuing to refer to FIG. 3, a compensation circuit 340 is introduced between the charge pump 100 and the load 320. A switch 344 is controllable to selectively introduce a compensation capacitor 342 to the output of the charge pump 100.

Various factors can affect the efficiency of the power conversion illustrated in FIG. 3, including the voltage of an input voltage source 392, the switching frequency of the charge pump 100, and the output current 10 (or somewhat equivalently the input or output current of the charge pump 100). The efficiency is also dependent on whether or not the compensation capacitor 342 is coupled to the output path via the switch 344. As a general approach, a controller 350 accepts inputs that characterize one or more factors that affect efficiency and outputs a control signal that sets the state of the switch 344 according to whether efficiency is expected to be improved introducing the compensation capacitor versus not. A further discussion of logic implemented by the controller 350 is provided later in this Description.

Figure 4:
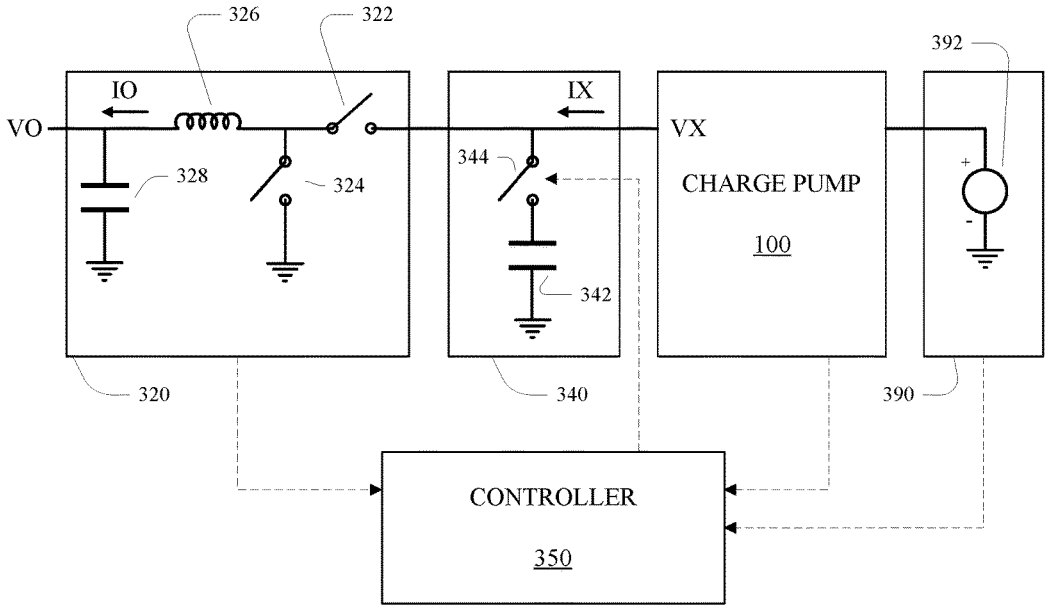

Referring to FIG. 4, in another example, a configuration of a charge pump 100 has a regulator 320 coupled via a compensation circuit 340 to the low-voltage terminal of a charge pump 100, and a voltage source 392 coupled to the high-voltage terminal of the charge pump 100. The regulator 320 (also referred to below generally interchangeably as a "converter") illustrated in FIG. 4 is a Buck converter, which consists of switches 322, 324, an inductor 326, and an output capacitor 328. The switches open and close (i.e., present high and low impedance, respectively) in alternating states, such that the switch 322 is open when then the switch 324 is closed, and the switch 322 is closed when the switch 324 is open. These switches operate at a frequency than can be lower, higher, or equal to the switches in the charge pump 100, with a duty cycle defined as the fraction of time that the switch 322 in the regulator 320 is closed. A preferred embodiment is when the switching frequency of the charge pump 100 is lower than the regulator 320. However, in the case the charge pump 100 is at a higher frequency than the regulator 320, the charge-pump 100 is disabled when the regulator 320 is off (low duty cycle) and the charge-pump 100 is enabled when the regulator 320 is on.

In general, the regulator 320 operates at its highest power efficiency when it operates at its highest duty cycle. In some examples, a controller of the regulator (not shown) adjusts the duty cycle in a conventional manner to achieve a desired output voltage VO. During the cycles of the regulator 320 in which the switch 322 is closed, the current passing from the charge pump 100 to the regulator 320 is effectively constant, equal to the current through the inductor 326. Assuming that the switching frequency of the regulator 320 is substantially higher than the switching frequency of the charge pump 100, the charge pump 100 can be considered to be driven by a pulsed current source with an average current equal to the duty cycle times the inductor current.

Note that as introduced above, in situations in which the regulator 320 sinks a pulsed current, then for a particular average current, the resistive energy loss generally increases as the duty cycle of the current decreases, approximately inversely with the duty cycle. There is a range of low duty cycles, and thereby high peak current relative to the average current, in which the resistive losses with a pulsed current exceed the losses for the same average current that would result from the charge pump 100 driving a relatively constant output voltage, for example, across a large output capacitor. Therefore, for a selected range of low duty cycles, the controller 350 closes the switch 344 and introduces a relatively large compensation capacitor 342 at the output of the charge pump 100. The result is that the charge pump 100 is presented with a substantially constant voltage, and therefore operates in a substantially "non-adiabatic" mode. Therefore, the controller 350 is effectively responsive to the output voltage because the duty cycle is approximately proportional to the output voltage. Thereby operating the charge pump 100 in an adiabatic mode at high output voltage and in a non-adiabatic mode at low output voltage; and switches between the adiabatic and non-adiabatic modes at a threshold duty cycle to maintain an optimum efficiency of the overall power conversion.

Figure 5:
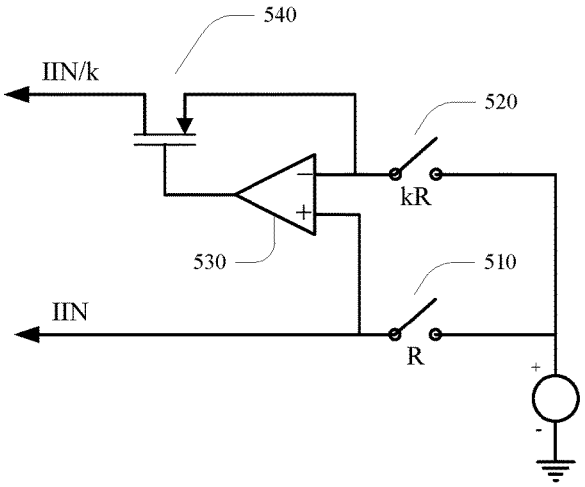
FIG. 5 is a circuit for measuring a charge pump current.

Examples of control logic implemented in the controller 350 in configurations such as those illustrated in FIGS. 4 and 5 can be under in view of the following discussion.

In general, a charge pump can operate in one of two unique operating conditions, or in the region in between them. In a slow switching limit (SSL) regime the capacitor currents in the charge pump have the time to settle to their final values and capacitor voltages experience significant change in magnitude from beginning to end of a cycle of the charge pump operation. In the fast switching limit (FSL) regime, the capacitors do not reach equilibrium during a cycle of the charge pump operation, for instance, due to a combination of one or more of high capacitances, high switching frequency, and high switch resistances.

Another factor relates to the capacitance at the output of the charge pump 100, which in the circuits of FIG. 4 can be increased by closing the switch 344 to add the compensation capacitor 342 to the output. For small output capacitance, the output current of the charge pump 100 is effectively set by the pulsed current characteristic of the regulator 320. As discussed above, for a given average current, the resistive power losses in the pulsed current case are approximately inversely proportional the duty cycle.

For large output capacitance, the RMS of the output current of the charge pump 100 is effectively determined by the equilibration of the internal capacitors of the charge pump 100 with the compensation capacitor 342 and the regulator 320. For a given average current, this resistive power loss is approximately inversely proportional to the square of the peak-to-peak voltage across the internal capacitors in the charge pump 100.

Four combinations of FSL/SSL and constant/pulsed IO modes of operation are possible. In some examples, each of these four modes is affected in different ways based on the addition of a compensation capacitor 342 as shown in FIGS. 3 and 4.

Case one: In FSL mode, with constant output current IO as in FIG. 3, introduction of the compensation capacitor 342 does not substantially affect conversion efficiency.

Case two: In FSL mode with pulsed output current as in FIG. 4, efficiency increases when the compensation capacitor 342 is introduced, thereby reducing the RMS current seen by the charge pump 100.

Case three: In SSL mode, with constant output current IO as in FIG. 3, efficiency generally increases without introduction of the compensation capacitor 342, thereby yielding adiabatic operation.

Case four: In SSL mode, with pulsed load current as in FIG. 4, efficiency depends on the relation between the average output current, the duty cycle, and how far the charge pump 100 is operating from the SSL/FSL boundary. For example, at low duty cycle, efficiency generally increases with introduction of the compensation capacitor 342, thereby yielding non-adiabatic operation. In contrast, at high duty cycle, efficiency generally increases without introduction of the compensation capacitor 342, thereby yielding adiabatic operation. Furthermore, when the charge pump 100 is in SSL mode, the farther from the SSL/FSL boundary, the lower the duty cycle at which the efficiency trend reverses.

Depending on the relative values of charge pump capacitors, switch resistances and frequency, it is possible that the charge pump operate in a regime between FSL and SSL. In this case, there is effectively a transition point between case four and case two at which the compensation capacitor is introduced according to the overall efficiency of the conversion. As described above, knowledge of the average charging current and its duty cycle is necessary in case four for determining if introduction of the compensation capacitor will improve efficiency.

In some implementations, the controller 350 does not have access to signals or data that directly provide the mode in which the power conversion is operating. One approach is for the controller to receive a sensor signal that represents the input current of the charge pump, and infer the operating mode from that sensor signal.

As an example, a sensor signal determined as a voltage across the switch at the high voltage terminal of the converter (e.g., the switch between source 109 and the capacitor C4 in FIG. 1) can be used to represent the current because when the switch is closed, the voltage is the current times the switch resistance.

An alternative circuit shown in FIG. 5 provides a scaled version of the input current IIN. The input switch 510, with closed resistance R is put in parallel with a second switch with closed resistance kR, for example, fabricated as a CMOS switch where the factor k depends on the geometry of the switch. When the switches are closed the differential amplifier 530 controls the gate voltage of a transistor 540 such that the voltage drop across the two switches are equal, thereby yielding the scaled input current IIN/k, which can be used to form a sensor input signal for the controller.

The sensed input current can be used to determine whether the compensation capacitor should be switched in, for example, according to a transition between case four and case two described above.

One possible method for determining the operation mode of the charge pump 100 consists of taking two or more measurements of the input current IIN and establishing that the difference between the values of consecutive samples is substantially zero for SSL mode, or is above a pre-determined threshold for FSL mode.

Another method is to measure the difference in the voltage of a capacitor in the charge pump 100. Once the input current IIN is known, the controller 350 can infer the operating mode based upon the voltage ripple on the capacitor over a full cycle. Note that the controller 350 does not necessarily know the particular sizes of capacitors that are used in the charge pump 100, for example, because the capacitors are discrete capacitors that are not predetermined. However, the capacitor values can be inferred from knowledge of the current, voltage ripple, and frequency, thereby allowing the controller 350 to determine whether the charge pump 100 is operating in the FSL or SSL mode. The controller 350 can then select adiabatic or non-adiabatic charging by controlling the switch 344 to selectively introduce the compensation capacitor 342.

Other controller logic is used in other implementations. For example, an alternative is for the controller to measure efficiency given by:

$$\eta = VO/(N*VIN)$$

where $\eta$ is the efficiency, VO is the measured converter output voltage, VIN is the measured converter input voltage, and N is the charge pump conversion ratio.

The controller directly measures the effect of selecting adiabatic vs. non-adiabatic charging on converter efficiency by comparing the average value of the output voltage VO over a complete charge pump cycle.

Other controller logic uses combinations of the approaches described above. For instance, the controller can confirm that the assessment of charge pump operating mode and estimation of efficiency increase by changing the charge pump charging mode.

Figure 6:
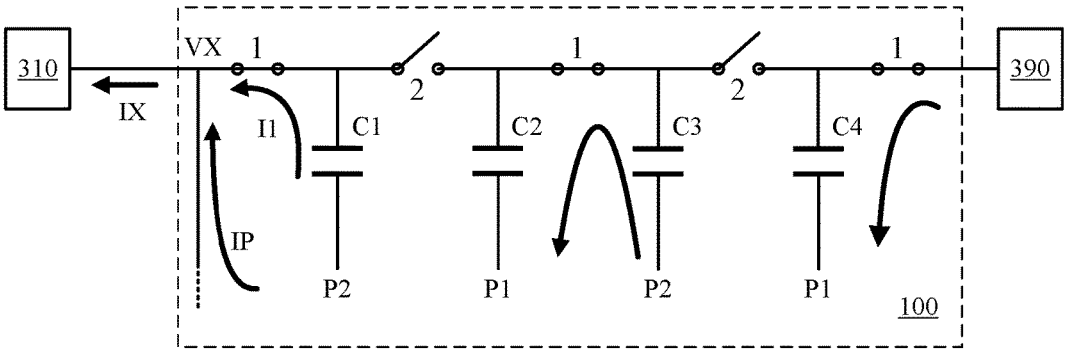
FIG. 6 is a schematic illustrating charge transfer during one cycle of the charge pump illustrated in FIG. 4.

A traditional method for operating the charge pump 100 is at a fixed frequency in which the switching occurs independently of the load requirement (i.e., the switches in FIG. 1 operate on a fixed time period). Referring to FIG. 6, during one cycle of the switching of the charge pump 100, a current I1 discharges from the capacitor C1 and a current IP discharges other of the capacitors in the charge pump 100. For a particular intermediate current IX, the longer the cycle time T, the larger the drop in voltage provided by the capacitor C1. A consequence of this is that the switching frequency generally limits the maximum intermediate current IX because the switching frequency for a particular load determines the extent of voltage excursions, and in some cases current excursions (i.e., deviations, variation), at various points and between various points within the charge pump 100 and at its terminals. For a particular design of charge pump 100, or characteristics of load and/or source of the charge pump 100, there are operational limits on the excursions.

Figure 7A:
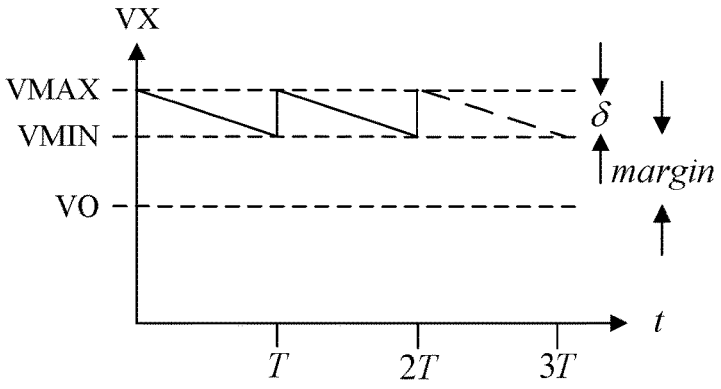
FIGS. 7A-C are graphs of output voltage of the charge pump illustrated in FIG. 4 at different output current and switching frequency conditions.
Figure 7B:
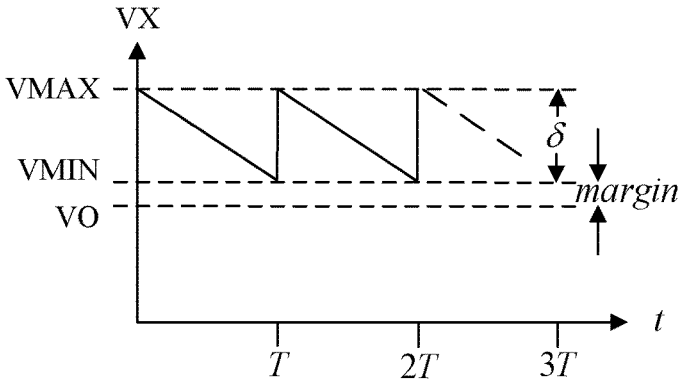
Figure 7C:
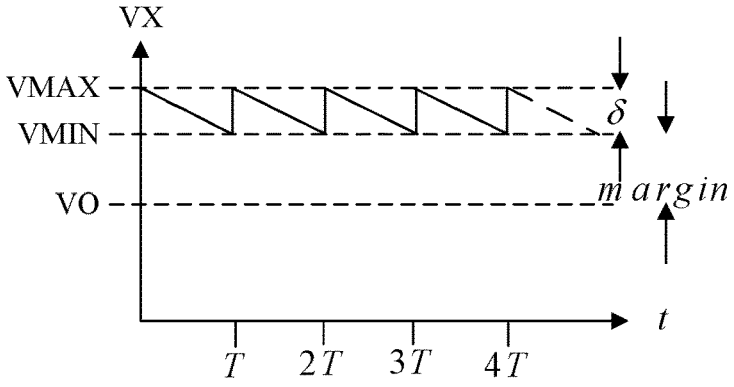
Figure 8:
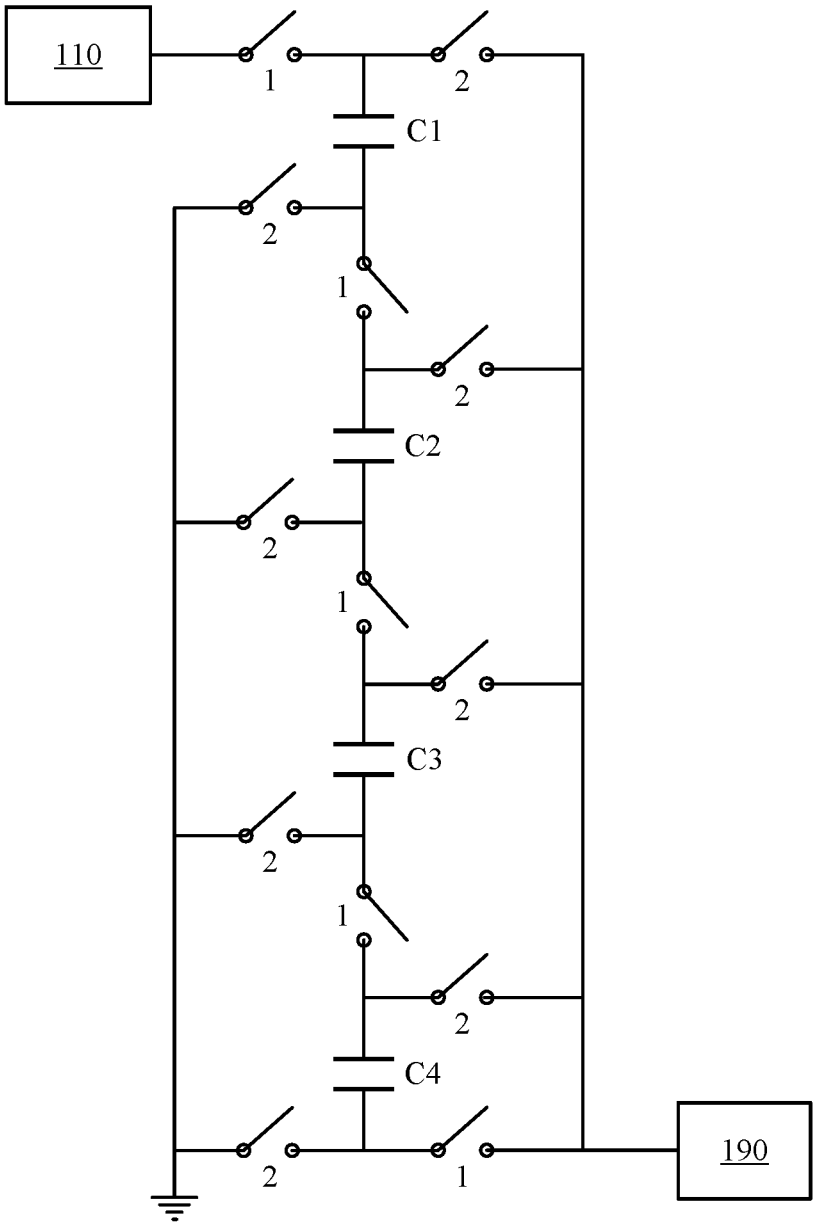
FIG. 8 is a single-phase series-parallel charge pump.

Referring to FIGS. 7A-C, the intermediate voltage VX of the charge pump 100 is shown in various current and timing examples. Referring to FIG. 7A, at a particular intermediate current IX, the intermediate voltage VX generally follows a saw-tooth pattern such that it increases rapidly at the start of each state, and then generally falls at a constant rate. Consequently, the rate of voltage drop depends on the output current IO. At a particular output current IO and switching time, a total ripple voltage δ results, and a margin over the output voltage VO is maintained, as illustrated in FIG. 7A. (Note that the graphs shown in FIGS. 7A-B do not necessarily show certain features, including certain transients at the state transition times, and related to the high frequency switching of the regulator 320; however these approximations are sufficient for the discussion below).

Referring to FIG. 7B, in the output current IO in the circuit in FIG. 4 increases, for instance by approximately a factor of two, the ripple of the intermediate voltage VX increases, and the minimum intermediate voltage VMIN decreases and therefore for a constant output voltage VO the margin (i.e. across inductor 316) in the regulator 320 decreases. However, if the voltage margin decreases below a threshold (greater than zero), the operation of the regulator 320 is impeded.

Referring to FIG. 7C, to provide the regulator 320 with a sufficient voltage margin voltage the switching frequency can be increases (and cycle time decreased), for example, to restore the margin shown in FIG. 7A. Generally, in this example, doubling the switching frequency compensates for the doubling of the output current IO. However more generally, such direct relationships between output current IO or other sensed signals and switching frequency are not necessary.

In general, a number of embodiments adapt the switching frequency of the charge pump 100 or determine the specific switching time instants based on measurements within the charge pump 100 and optionally in the low-voltage and/or high-voltage peripherals coupled to the terminals of the charge pump 100.

In a feedback arrangement shown in FIG. 4, the controller 350 adapts (e.g., in a closed loop or open loop arrangement) the switching frequency. For any current up to a maximum rated current with a fixed switching frequency, the charge pump 100 generally operates at a switching frequency lower than (i.e., switching times greater than) a particular minimum frequency determined by that maximum rated current. Therefore, when the current is below the maximum, capacitive losses may be reduced as compared to operating the charge pump 100 at the minimum switching frequency determined by the maximum rated current.

One approach to implementing this feedback operation is to monitor the intermediate voltage VX and adapt operation of the charge pump to maintain VMIN above a fixed minimum threshold. One way to adapt the operation of the charge pump 100 is to adapt a frequency for the switching of the charge pump 100 in a feedback configuration such that as the minimum intermediate voltage VMIN approaches the threshold, the switching frequency is increased, and as it rises above the threshold the switching frequency is reduced. One way to set the fixed minimum threshold voltage is as the maximum (e.g., rated) output voltage VO of the regulator 320, plus a minimum desired margin above that voltage. As introduced above, the minimum margin (greater than zero) is required to allow a sufficient voltage differential (VX–VO) to charge (i.e., increase its current and thereby store energy in) the inductor 326 at a reasonable rate. The minimum margin is also related to a guarantee on a maximum duty cycle of the regulator 320.

A second approach adapts to the desired output voltage VO of the regulator 320. For example, the regulator 320 may have a maximum output voltage VO rating equal to 3.3 volts. With a desired minimum margin of 0.7 volts, the switching of the charge pump 100 would be controlled to keep the intermediate voltage VX above 4.0 volts. However, if the converter is actually being operated with an output voltage VO of 1.2volts, then the switching frequency of the charge pump 100 can be reduced to the point that the intermediate voltage VX falls as low as 1.9 volts and still maintain the desired margin of 0.7 volts.

In a variant of the second approach, rather than monitoring the actual output voltage VO, an average of the voltage between the switches 312, 314 may be used as an estimate of the output voltage VO.

In yet another variant, the switching frequency of the charge pump 100 is adapted to maintain the intermediate voltage VX below a threshold value. For example, the threshold can be set such that the intermediate voltage VX lowers or rises a specific percentage below or above the average of the intermediate voltage VX (e.g. 10%). This threshold would track the intermediate voltage VX. Similarly, a ripple relative to an absolute ripple voltage (e.g. 100 mV) can be used to determine the switching frequency.

Note also that the voltage ripple on the output voltage VO depends (not necessarily linearly) on the voltage ripple on the intermediate voltage VX, and in some examples the switching frequency of the charge pump 100 is increased to reduced the ripple on the output voltage VO to a desired value.

Other examples measure variation in internal voltages in the charge pump 100, for example, measuring the ripple (e.g., absolute or relative to the maximum or average) across any of the capacitors C1 through C4. Such ripple values can be used instead of using the ripple on the intermediate voltage VX in controlling the switching frequency of the charge pump 100. Other internal voltages and/or currents can be used, for example, voltages across switches or other circuit elements (e.g., transistor switches), and the switching frequency can be adjusted to avoid exceeding rated voltages across the circuit elements.

In addition to the desired and/or actual output voltages or currents of the regulator 320 being provided as a control input to the controller 350, which adapts the switching frequency of the charge pump 100, other control inputs can also be used. One such alternative is to measure the duty cycle of the regulator 320. Note that variation in the intermediate voltage VX affects variation in current in the Buck converter's inductor 326. For example, the average of the intermediate voltage VX is generally reduced downward with reducing of the switching frequency of the charge pump 100. With the reduction of the average output voltage VO, the duty cycle of the regulator 320 generally increases to maintain the desired output voltage VO. Increasing the duty cycle generally increases the efficiency of a Buck converter. So reducing the switching frequency of the charge pump 100 can increase the efficiency of the regulator 320.

It should be understood that although the various signals used to control the switching frequency may be described above separately, the switch frequency can be controlled according to a combination of multiple of the signals (e.g., a linear combination, nonlinear combination using maximum and minimum functions, etc.). In some examples, an approximation of an efficiency of the charge pump is optimized.

The discussion above focuses on using the controller 350 to adjust the switching frequency of the charge pump 100 in relatively slow scale feedback arrangement. The various signals described above as inputs to the controller 350 can be used on an asynchronous operating mode in which the times at which the charge pump 100 switches between cycles is determined according to the measurements. As one example, during state one as illustrated in FIG. 6, the intermediate voltage VX falls, and when VX−VO reaches a threshold value (e.g., 0.7 volts), the switches in the charge pump 100 are switched together from state one to state two. Upon the transition to state two, the intermediate voltage VX rises and then again begins to fall, and when VX−VO again reaches the threshold value, the switches in the charge pump 100 are switched together from state two back to state one.

In some examples, a combination of asynchronous switching as well as limits or control on average switching frequency for the charge pump are used.

Unfortunately, as the intermediate current IX decreases the switching frequency of the charge pump 100 decreases as well. This can be problematic at low currents because the frequency could drop below 20 kHz, which is the audible limit for human hearing. Therefore, once the frequency has dropped below a certain limit, a switch 344 closes and introduces a compensation capacitor 342. This forces the converter into non-adiabatic operation allowing the frequency to be fixed to a lower bound (e.g. 20 kHz). Consequently, the compensation capacitor 342 is introduced when either the duty cycle is low or when the output current IO is low.

Note that the examples above concentrate on a compensation circuit that permits selectively switching a compensation capacitor of a certain fixed capacitance onto the output of the charge pump. More generally, a wide variety of compensation circuits can be controlled. One example is a variable capacitor, which can be implemented as a switched capacitor bank, for example, with power of two capacitances. The optimal choice of capacitance generally depends on the combination of operating conditions (e.g., average current, pulsed current duty cycle, etc.) and/or circuit configurations (e.g., type of regulators, sources, load, pump capacitors), with the determining of the desired capacitance being based on prior simulation or measurement or based on a mechanism that adjusts the capacitance, for instance, in a feedback arrangement. In addition, other forms of compensation circuits, for example, introducing inductance on the output path, networks of elements (e.g., capacitors, inductors).

Note that the description focuses on a specific example of a charge pump. Many other configurations of charge pumps, including Dickson pumps with additional stages or parallel phases, and other configurations of charge pumps (e.g., series-parallel), can be controlled according to the same approach. In addition, the peripherals at the high and/or low voltage terminals are not necessarily regulators, or necessarily maintain substantially constant current. Furthermore, the approaches described are applicable to configurations in which a high voltage supply provides energy to a low voltage load, or in which a low voltage supply provides energy to a high voltage load, or bidirectional configurations in which energy may flow in either direction between the high and the low voltage terminal of the charge pump. It should also be understood that the switching elements can be implemented in a variety of ways, including using Field Effect Transistors (FETs) or diodes, and the capacitors may be integrated into a monolithic device with the switch elements and/or may be external using discrete components. Similarly, at least some of the regulator circuit may in some examples be integrated with some or all of the charge pump in an integrated device.

Implementations of the approaches described above may be integrated into an integrated circuit that includes the switching transistors of the charge pump, either with discrete/off-chip capacitors or integrated capacitors. In other implementations, the controller that determines the switching frequency of the charge pump and/or the compensation circuit may be implemented in a different device than the charge pump. The controller can use application specific circuitry, a programmable processor/controller, or both. In the programmable case, the implementation may include software, stored in a tangible machined readable medium (e.g., ROM, etc.) that includes instructions for implementing the control procedures described above.

It is to be understood that the foregoing description is intended to illustrate and not to limit the scope of the invention, which is defined by the scope of the appended claims. Other embodiments are within the scope of the following claims.

What is claimed is:

[1. An apparatus comprising a switched-capacitor charge pump configured to provide voltage conversion between first and second terminals thereof, a compensation circuit coupled to a first terminal of said charge pump, said compensation circuit having a first configuration and a second configuration, wherein, in said first configuration, said first terminal of said charge pump couples to a capacitance, wherein, in said second configuration, said capacitance is decoupled from said first terminal of said charge pump, and a controller coupled to said charge pump and said compensation circuit, said controller comprising an output for configuring said compensation circuit, and a first sensor input for accepting a first sensor-signal that, at least in part, characterizes operation of a circuit selected from the group consisting of said charge pump and a peripheral circuit directly coupled to said charge pump, wherein said controller is configured to configure said compensation circuit based at least in part on said first sensor-signal to promote efficiency of power conversion between a power source coupled to said charge pump and a load coupled to said charge pump via said compensation circuit.]

[2. The apparatus of claim 1, wherein said first sensor-signal characterizes a voltage at said peripheral circuit.]

[3. The apparatus of claim 1, wherein said charge pump comprises a capacitor, and wherein said first sensor-signal characterizes a voltage across said capacitor.]

[4. The apparatus of claim 1, wherein at least some current that passes from said charge pump to said compensation circuit continues through to an inductor in said peripheral circuit.]

[5. The apparatus of claim 1, wherein said controller comprises a second sensor input for accepting a second sensor-signal that, at least in part, characterizes operation of said circuit.]

[6. The apparatus of claim 1, wherein said controller is configured to determine an operating mode at least in part based on said first sensor-signal, and to determine said configuration of said compensation circuit according to said determined mode.]

[7. The apparatus of claim 1, wherein said first sensor-signal characterizes a voltage at said first terminal.]

[8. The apparatus of claim 1, wherein said controller is configured to couple said first terminal to said capacitance at times that optimize power-conversion efficiency.]

[9. The apparatus of claim 1, wherein said first sensor-signal characterizes said switching frequency of said charge pump.]

[10. The apparatus of claim 1, wherein said first sensor-signal characterizes a voltage at said second terminal.]

[11. The apparatus of claim 1, wherein said charge pump comprises a series-parallel charge pump.]

[12. The apparatus of claim 1, wherein said first sensor-signal characterizes a duty cycle of a pulsed current passing to or from said charge pump.]

[13. The apparatus of claim 1, wherein said first sensor-signal characterizes an average of a current passing to said charge pump.]

[14. The apparatus of claim 1, wherein said peripheral circuit comprises an inductor that is coupled to said compensation circuit.]

[15. The apparatus of claim 1, wherein said peripheral circuit is coupled between said compensation circuit and said first terminal and wherein said peripheral circuit comprises an inductor, switches, and an output capacitor, wherein control of said switches of said peripheral circuit adjusts a voltage across said output capacitor.]

[16. The apparatus of claim 1, wherein said peripheral circuit, which is coupled to said compensation circuit, comprises a switch that alternates between being open and being closed, wherein adjustment of a fraction of time during which said switch is closed.]

[17. The apparatus of claim 1, wherein said peripheral circuit is coupled between said compensation circuit and one of said first and second terminals and wherein said peripheral circuit comprises an inductor that is selectively connected to and disconnected from said compensation circuit.]

[18. The apparatus of claim 1, further comprising a regulator, wherein said regulator is coupled to said compensation circuit.]

[19. The apparatus of claim 1, wherein said compensation circuit is coupled to a regulator that achieves a selected output voltage by adjustment of a duty cycle thereof.]

[20. The apparatus of claim 1, further comprising a regulator, wherein said regulator is coupled between said compensation circuit and said high-voltage terminal.]

[21. The apparatus of claim 1, further comprising a regulator, wherein said regulator is coupled between said compensation circuit and said low-voltage terminal.]

[22. A method comprising carrying out voltage conversion, wherein carrying out voltage conversion comprises receiving a sensor signal that characterizes, at least in part, operation of a circuit that is selected from the group consisting of a switched-capacitor charge pump that provides voltage conversion between first and second terminals thereof and a peripheral circuit, wherein said peripheral circuit is directly connected to said switched capacitor charge pump, and based at least in part on said sensor signal, causing a compensation circuit that is coupled to a first terminal of said charge pump to transition between coupling and decoupling a capacitance from said first terminal, and wherein causing said compensating circuit to transition comprises causing said compensation circuit to transition at times that promote efficiency of power conversion between a power source coupled to said charge pump and a load coupled to said charge pump via said compensation circuit.]

[23. An apparatus comprising a power converter, said power converter comprising first and second terminals, said power converter being configured to cause a second voltage to be maintained at said second terminal in response to presence of a first voltage presented at said first terminal, wherein said power converter further comprises a compensation circuit, a controller, a switching network, and capacitors, wherein said switching network interconnects said capacitors, wherein, as a result of transitioning between first and second states thereof, said switching network causes said capacitors to transition between corresponding first and second arrangements, wherein as a result of a transition, electrical charge propagates between said capacitors, wherein said controller is connected to receive, from at least one of a first circuit and a second circuit, information indicative of an extent to which said propagation of said electrical charge between said capacitors results in energy loss, wherein said controller is configured to cause said compensation circuit to transition between a first configuration and a second configuration based on said information, said transition being one that reduces said extent and that causes a capacitance of said compensation circuit to be switched into or out of communication with said first circuit, wherein said first circuit is a circuit that is formed by said switching network and said capacitors, and wherein said second circuit is a circuit that is directly connected to a circuit that is formed by said capacitors and said switching network.]

[24. The apparatus of claim 23, wherein said second circuit comprises an inductor.]

*25. An apparatus comprising:*

*a controller comprising a circuit and configured to be coupled to a charge pump, wherein the charge pump includes a plurality of switches, the charge pump configured to operate a switching frequency in which during one or more cycles of the switching frequency various configurations result via switching states of switches within the plurality of switches to provide charging and/or discharging paths with respect to one or more capacitors and one or more inductors during charge pump operation and the charge pump including one or more internal sensors to respectively measure voltage at one or more voltage nodes within the charge pump and/or current along one or more current paths within the charge pump,*

*the controller configured to adjust a timing pattern of switching of the charge pump based, at least in part, on one or more internal measurement signals of the one or more internal sensors.*

*26. The apparatus of claim 25, wherein the controller is configured to adjust the timing pattern of the switching of the charge pump by adjusting the switching frequency.*

*27. The apparatus of claim 26, wherein the controller is configured to adjust the switching frequency in conjunction with one or more other operating characteristics to improve power efficiency of the charge pump relative to without an adjustment of the switching frequency.*

*28. The apparatus of claim 26, wherein the controller is configured to adjust the switching frequency for an open loop charge pump configuration.*

*29. The apparatus of claim 26, wherein the controller is configured to adjust the switching frequency for a closed loop charge pump configuration.*

*30. The apparatus of claim 26, wherein the one or more internal measurement signals comprise multiple measurement signals, wherein the one or more internal sensors comprise multiple internal sensors, wherein the controller is*

*configured to adjust the switching frequency based, at least in part, on a combination of the multiple measurement signals from the multiple internal sensors.*

*31. The apparatus of claim 25, wherein the controller is configured to adjust the timing pattern of the switching by limiting and/or at least partially controlling an average switching frequency of the charge pump.*

*32. The apparatus of claim 25, wherein the controller is configured to adjust the timing pattern of the switching by adjusting a duty cycle of the charge pump.*

*33. The apparatus of claim 32, wherein the one or more internal sensors are configured to measure time variation of a current along a current path within the charge pump via the one or more internal measurement signals, the one or more internal measurement signals to be measured within the one or more cycles of operation of the charge pump.*

*34. The apparatus of claim 33, wherein the current along a current path comprises a current through the one or more inductors of the charging pump.*

*35. The apparatus of claim 25, further comprising the charge pump, wherein the controller is coupled to the charge pump.*

*36. The apparatus of claim 35, wherein the charge pump is coupled to a regulator.*

*37. The apparatus of claim 35, wherein the one or more capacitors are off-chip relative to the plurality of switches, and wherein the charge pump comprises a bidirectional charge pump.*

*38. The apparatus of claim 35, further comprising the one or more capacitors, wherein the charge pump comprises: a Dickson charge pump; a Dickson charge pump with one or more additional stages; a Dickson charge pump with one or more parallel phases; a series-parallel charge pump; a series-parallel charge pump with one or more additional stages; and/or a series-parallel charge pump with one or more parallel phases.*

*39. The apparatus of claim 38, wherein the plurality of switches are configured to transfer charge between capacitors during alternating states of the charge pump operation.*

*40. The apparatus of claim 25, wherein the one or more internal sensors are configured to measure time variation of a current along a current path within the charge pump via the one or more internal measurement signals, the one or more internal measurement signals to be measured within the one or more cycles of operation of the charge pump.*

*41. The apparatus of claim 25, wherein the one or more internal sensors are configured to measure time variation of a voltage at a voltage node within the charge pump via the one or more internal measurement signals, the one or more internal measurement signals to be measured within the one or more cycles of operation of the charge pump.*

*42. The apparatus of claim 41, wherein the time variation of the voltage at the voltage node within the charge pump to comprise a time variation of a voltage at a voltage node of the one or more capacitors of the charge pump.*

*43. The apparatus of claim 41, wherein the time variation of the voltage at the voltage node within the charge pump to comprise a time variation of a voltage at a voltage node of a switch of the charge pump.*

*44. The apparatus of claim 43, wherein the voltage at the voltage node of the switch of the charge pump to comprise a voltage at a closed switch of the charge pump to be generated from a current measurement at the closed switch.*

*45. The apparatus of claim 25, wherein the charge pump includes one or more sensors configured to measure output voltage and/or output current of the charge pump, the controller configured to process one or more measurements of the output voltage and/or the output current.*

*46. The apparatus of claim 45, wherein the controller is configured to adjust the timing pattern of the switching further based, at least in part, on the one or more measurements of the one or more sensors of the output voltage and/or the output current of the charge pump.*

*47. The apparatus of claim 25, wherein the controller is implemented via an application specific integrated circuit.*

*48. The apparatus of claim 25, wherein the controller is implemented via a programmable processor.*

*49. The apparatus of claim 48, wherein the programmable processor comprises software stored on a machine-readable medium to implement the controller via execution of the software with respect to the programmable processor.*

*50. A method comprising:*

*operating a charge pump at a switching frequency in which during one or more cycles of the switching frequency various configurations result via switching states of switches within a plurality of switches to provide charging and/or discharging paths with respect to one or more capacitors and one or more inductors during charge pump operation;*

*measuring respectively voltage at one or more voltage nodes within the charging pump and/or current along one or more current paths within the charge pump as one or more internal measurement signals of one or more internal sensors of the charge pump; and*

*adjusting a timing pattern of switching of the charge pump during the one or more cycles.*

*51. The method of claim 50, wherein the adjusting the timing pattern of the switching comprises adjusting the switching frequency based, at least in part, on the one or more internal measurement signals.*

*52. The method of claim 51, wherein the adjusting of the switching frequency comprises adjusting the switching frequency in a closed loop charge pump configuration.*

*53. The method of claim 51, wherein the adjusting the switching frequency based, at least in part, on the one or more internal measurement signals comprises adjusting the switching frequency based, at least in part, on a combination of multiple measurements from multiple internal sensors.*

*54. The method of claim 50, wherein the adjusting the timing pattern of the switching comprises adjusting a duty level of the charge pump based, at least in part, on the one or more internal measurement signals.*

*55. The method of claim 50, wherein the measuring the voltage at one ore more voltage nodes within the charge pump comprises measuring a voltage at a voltage node of a switch of the charge pump.*

* * * * *